(12) United States Patent
Sakakibara

(10) Patent No.: US 9,837,929 B2
(45) Date of Patent: Dec. 5, 2017

(54) POWER CONVERTER

(71) Applicant: DAIKIN INDUSTRIES, LTD., Osaka-Shi, Osaka (JP)

(72) Inventor: Kenichi Sakakibara, Osaka (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 0 days.

(21) Appl. No.: 15/510,718

(22) PCT Filed: Sep. 24, 2015

(86) PCT No.: PCT/JP2015/076847
§ 371 (c)(1),
(2) Date: Mar. 13, 2017

(87) PCT Pub. No.: WO2016/047651
PCT Pub. Date: Mar. 31, 2016

(65) Prior Publication Data
US 2017/0279372 A1    Sep. 28, 2017

(30) Foreign Application Priority Data

Sep. 25, 2014  (JP) ................ 2014-194927

(51) Int. Cl.
*H02M 5/458* (2006.01)
*H02M 7/48* (2007.01)
(Continued)

(52) U.S. Cl.
CPC ............ *H02M 7/48* (2013.01); *F03G 7/08* (2013.01); *H02J 3/36* (2013.01); *H02M 1/4225* (2013.01); *H02M 5/458* (2013.01)

(58) Field of Classification Search
CPC ..................................... H02M 5/458
(Continued)

(56) References Cited

U.S. PATENT DOCUMENTS 9,490,722 B2    11/2016  Sakakibara
9,698,699 B2*   7/2017   Yamashita ............ H02M 5/458
(Continued)

FOREIGN PATENT DOCUMENTS

JP    2009-278857 A    11/2009
JP    2011-193678 A     9/2011
(Continued)

OTHER PUBLICATIONS

Irie, "Ripple Compensation for a Single-Phase Rectifier by 2-Quadrant Chopper and Auxiliary Capacitor", the Institute of Electrical Engineers of Japan (IEEJ) Transactions D, vol. 112, No. 7, pp. 623-629 (1992).
(Continued)

*Primary Examiner* — Jeffrey Sterrett
(74) *Attorney, Agent, or Firm* — Birch, Stewart, Kolasch & Birch, LLP

(57) ABSTRACT

A discharge duty that is a duty at which a switch is conductive takes a value obtained by dividing a product of a crest value of a single-phase AC voltage and a square of a cosine value of a phase of the single-phase AC voltage by a both-end voltage across a capacitor. A sum of a product of a rectifying duty that is a duty at which a converter is conductive and a rectified voltage output from the converter and a product of the both-end voltage and the discharge duty varies in a period that is a half of the period of the single-phase AC voltage.

10 Claims, 18 Drawing Sheets

(51) Int. Cl.
*F03G 7/08* (2006.01)
*H02M 1/42* (2007.01)
*H02J 3/36* (2006.01)

(58) Field of Classification Search
USPC .............................................. 363/34, 36, 37
See application file for complete search history.

(56) References Cited

U.S. PATENT DOCUMENTS

| | | | | |
|---|---|---|---|---|
| 2009/0086515 | A1* | 4/2009 | Sakakibara | H02M 5/4585 363/37 |
| 2011/0025246 | A1* | 2/2011 | Sakakibara | H02M 1/4216 318/400.42 |
| 2012/0187929 | A1* | 7/2012 | Ohshita | H02M 3/1584 323/272 |
| 2015/0236606 | A1* | 8/2015 | Sakakibara | H02M 5/4585 363/37 |
| 2015/0244282 | A1 | 8/2015 | Yamashita et al. | |
| 2015/0280601 | A1* | 10/2015 | Sakakibara | H02M 1/15 363/37 |
| 2016/0233782 | A1* | 8/2016 | Sakakibara | H02M 1/4225 |
| 2016/0248335 | A1* | 8/2016 | Sakakibara | H02M 1/14 |
| 2016/0294300 | A1 | 10/2016 | Sakakibara et al. | |
| 2017/0201202 | A1* | 7/2017 | Yamashita | H02P 27/08 |

FOREIGN PATENT DOCUMENTS

| | | |
|---|---|---|
| JP | 2012-135184 A | 7/2012 |
| JP | 5454732 B1 | 3/2014 |
| JP | 2014-82926 A | 5/2014 |
| JP | 2015-84537 A | 4/2015 |
| WO | WO 2014/046012 A1 | 3/2014 |
| WO | WO 2014/050987 A1 | 4/2014 |

OTHER PUBLICATIONS

Ohnuma, "Circuit Configuration and Control Strategy of single-to-three Phase Power Converter with Active Buffer and Charge Circuit", the 2010 Annual Meeting of IEEJ, 4-057 (2010).

Ohnuma, "Comparison between a Boost Chopper and an Active Buffer as a Single to Three Phase Converter", 2011 Annual Meeting of IEEJ, 4-042 (2011).

Ohnuma, "Control Strategy of Single Phase to Three Phase Power Converter Using an Active Snubber", 2008 IEEJ Industry Applications Society Conference, 1-20 (2008).

* cited by examiner

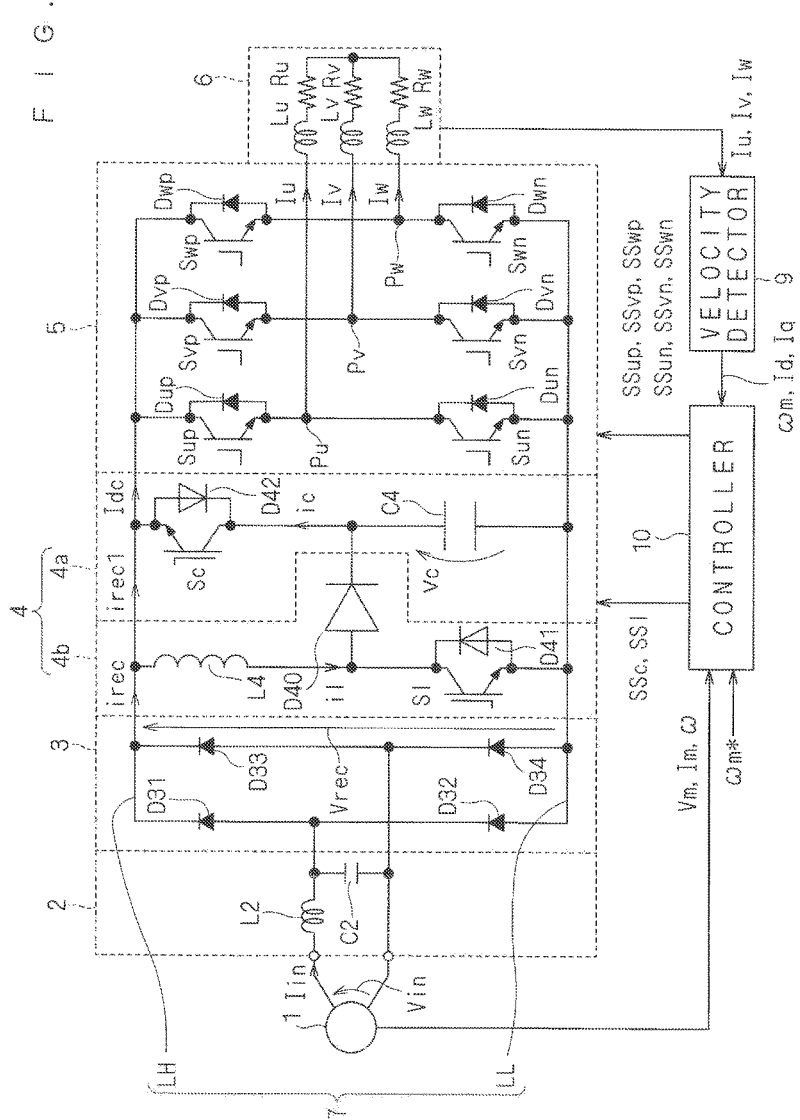
F I G . 1

F I G. 4
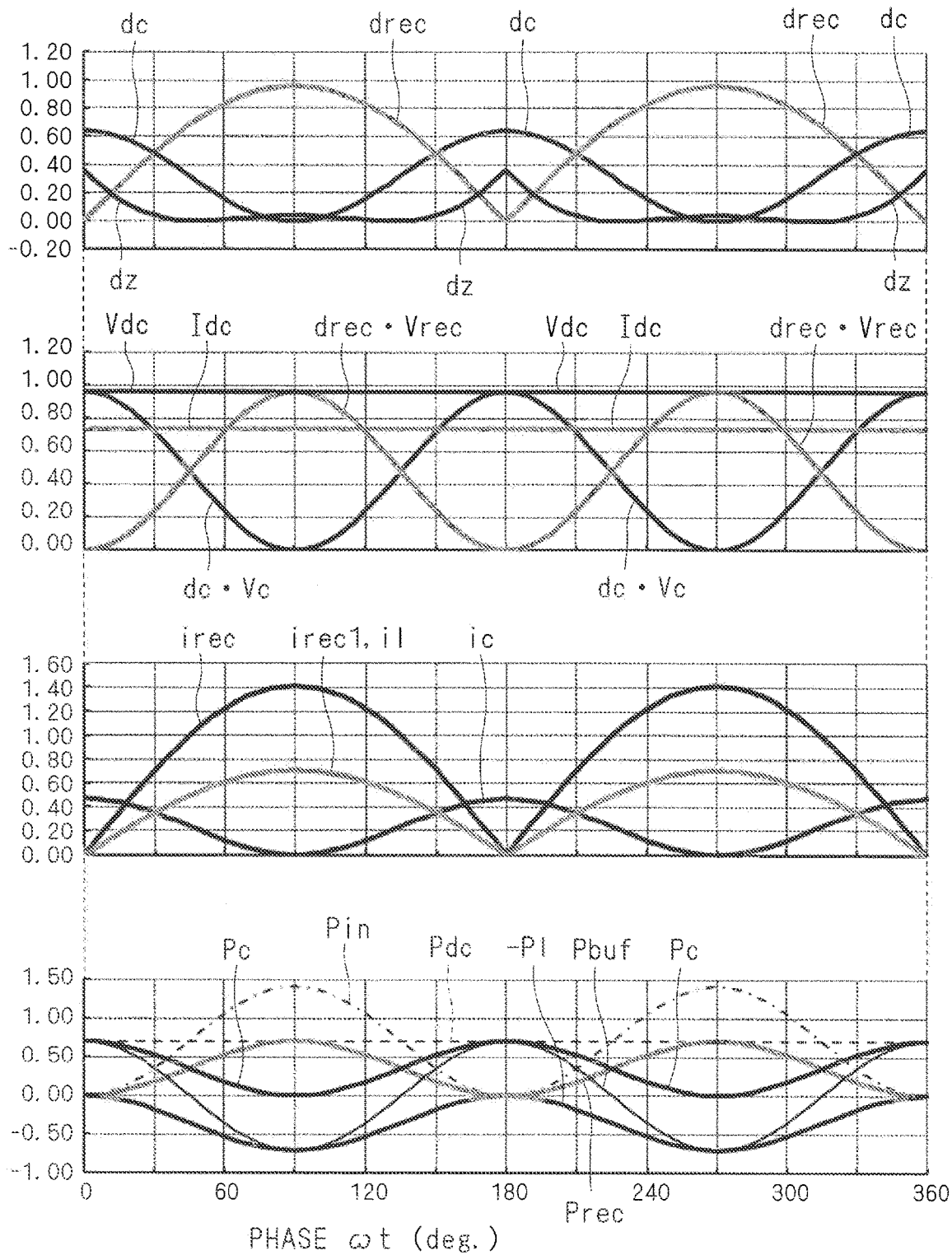

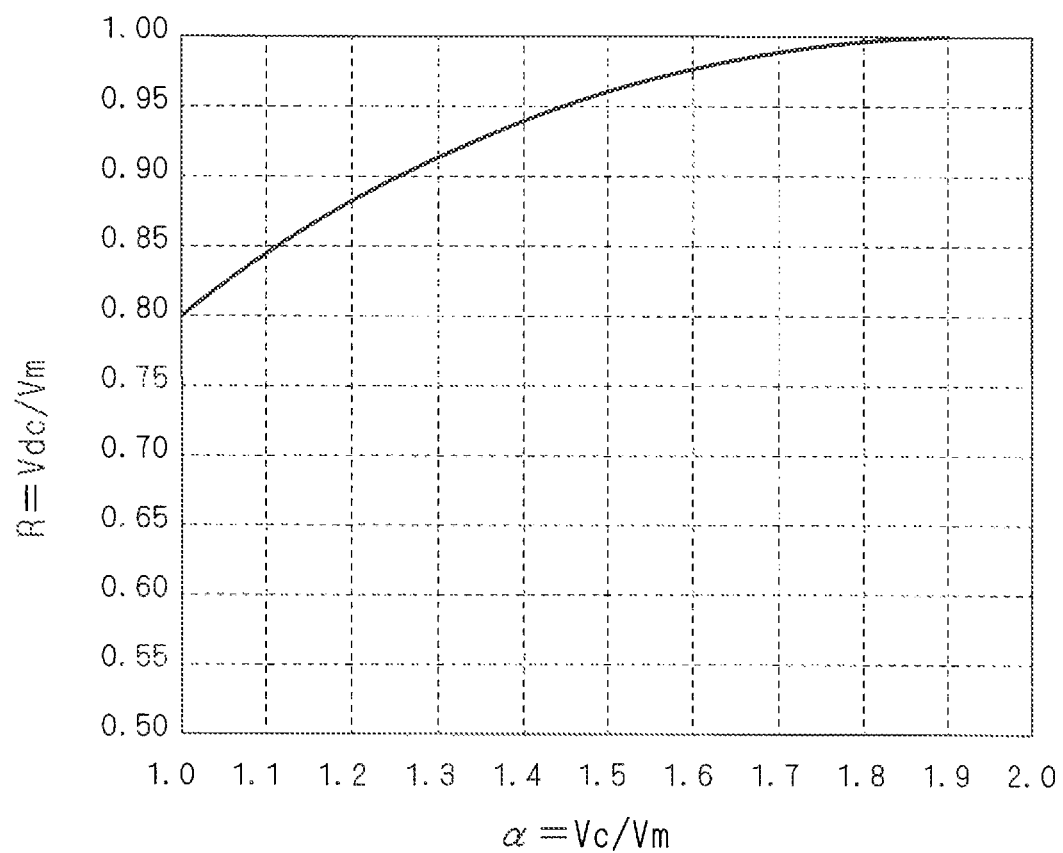
F I G . 5

F I G. 8
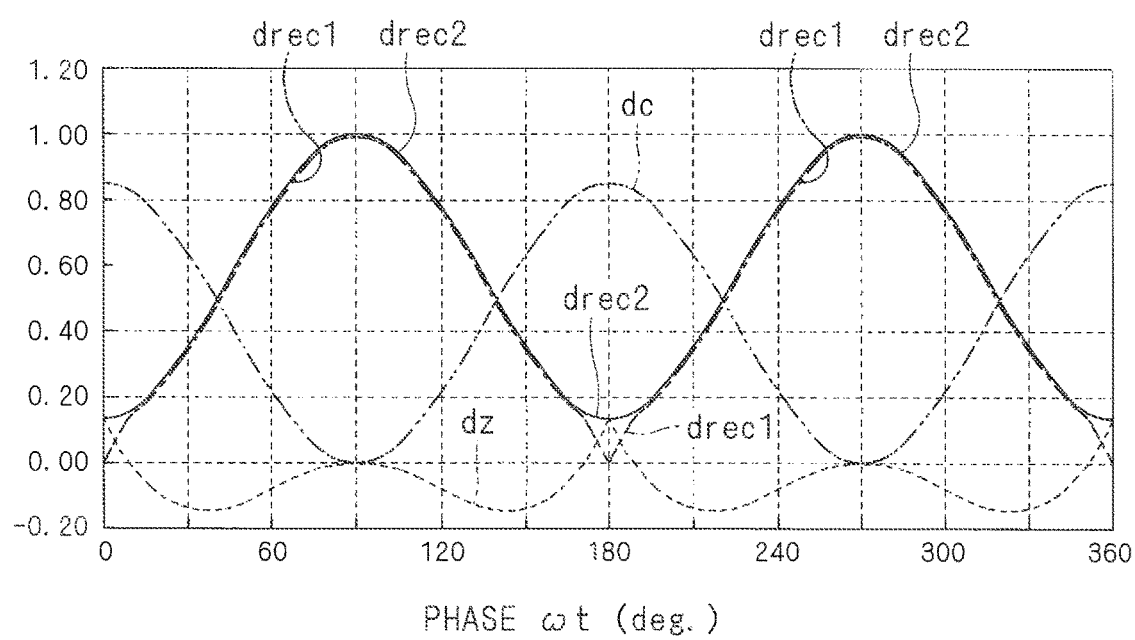

F I G . 9
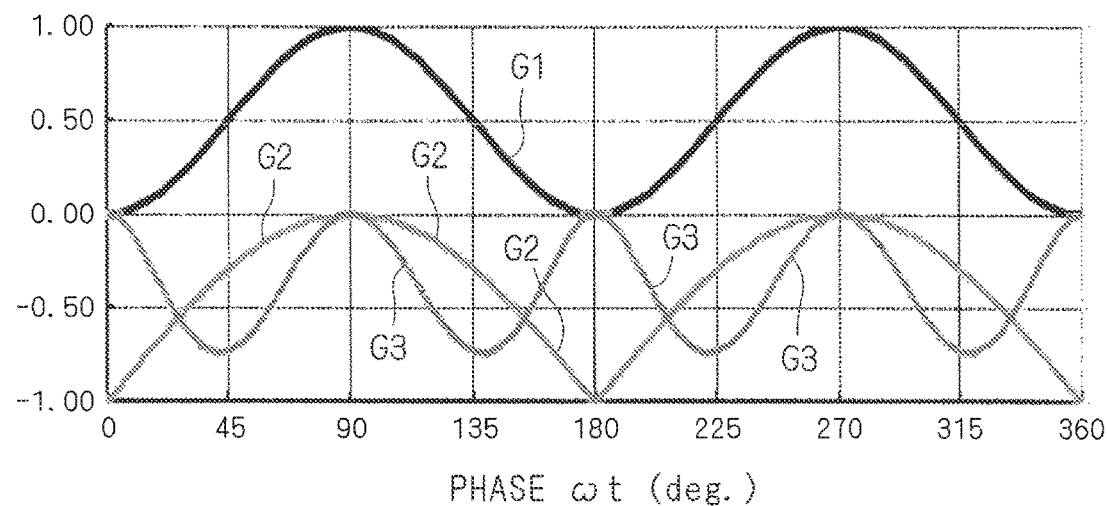
F I G . 1 0
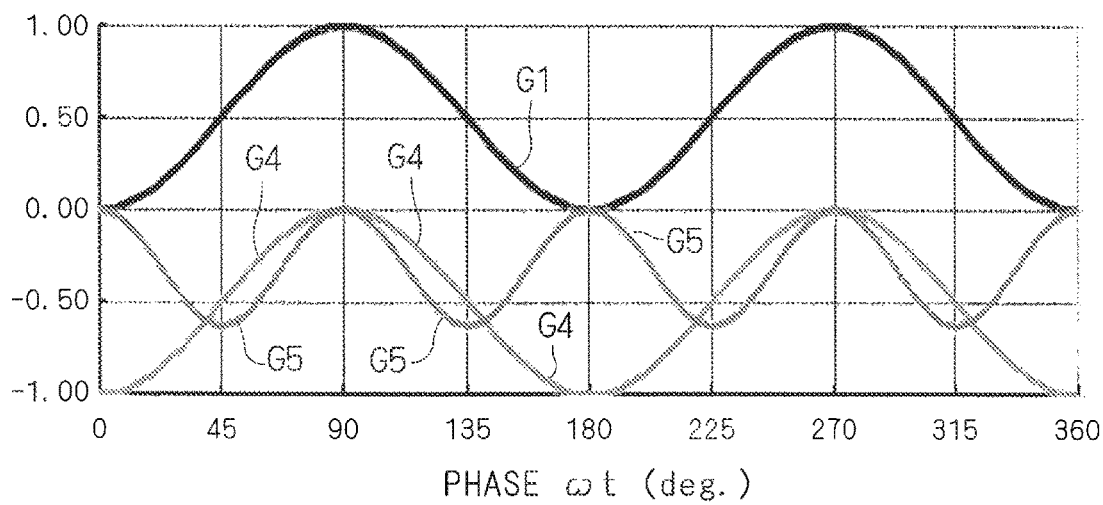

F I G. 1 1
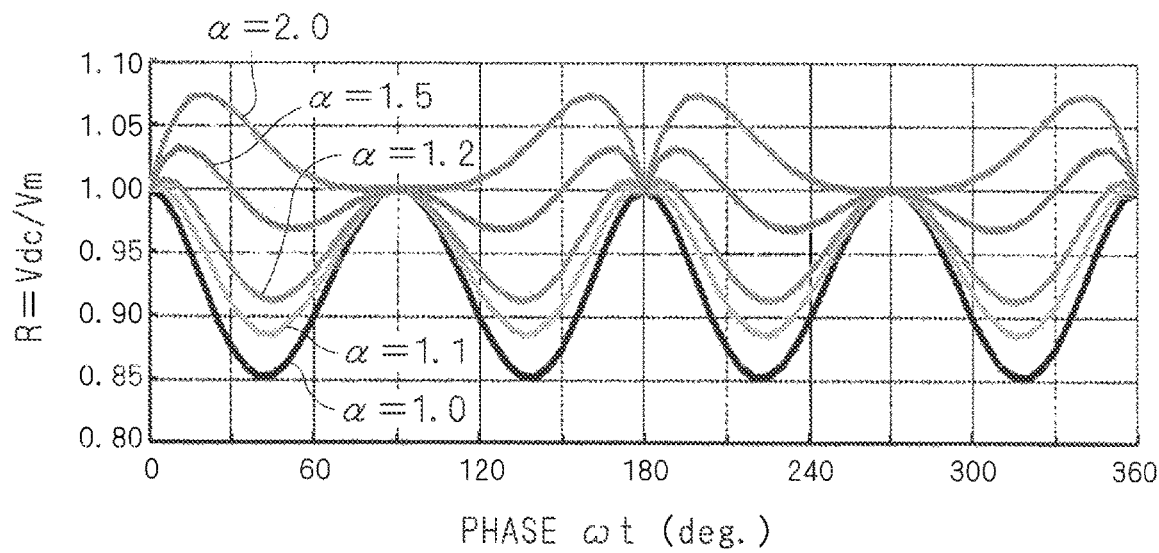
F I G. 1 2
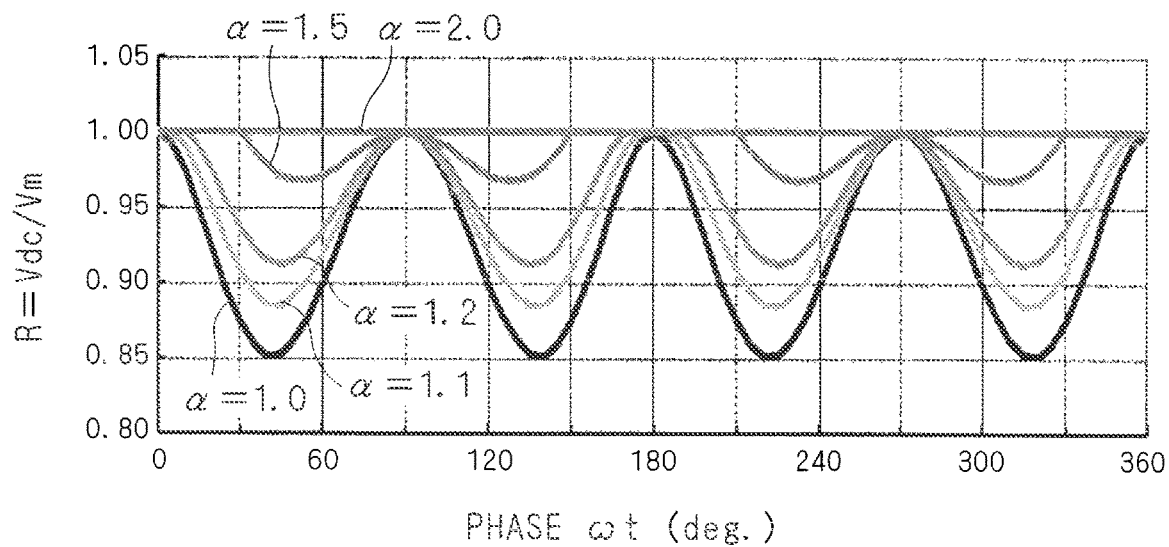

F I G. 1 5
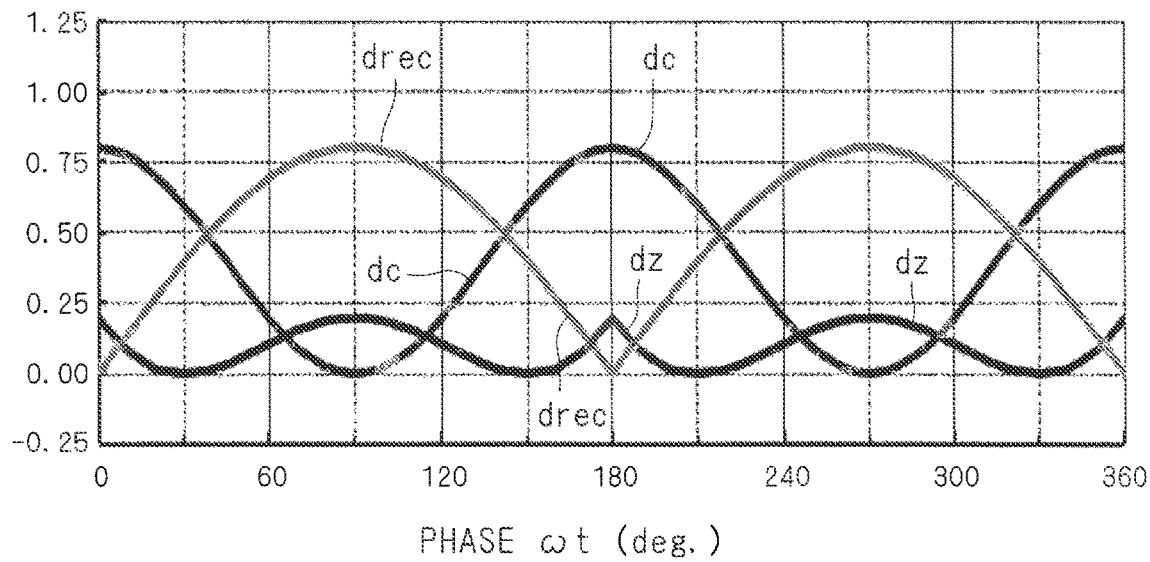
F I G. 1 6
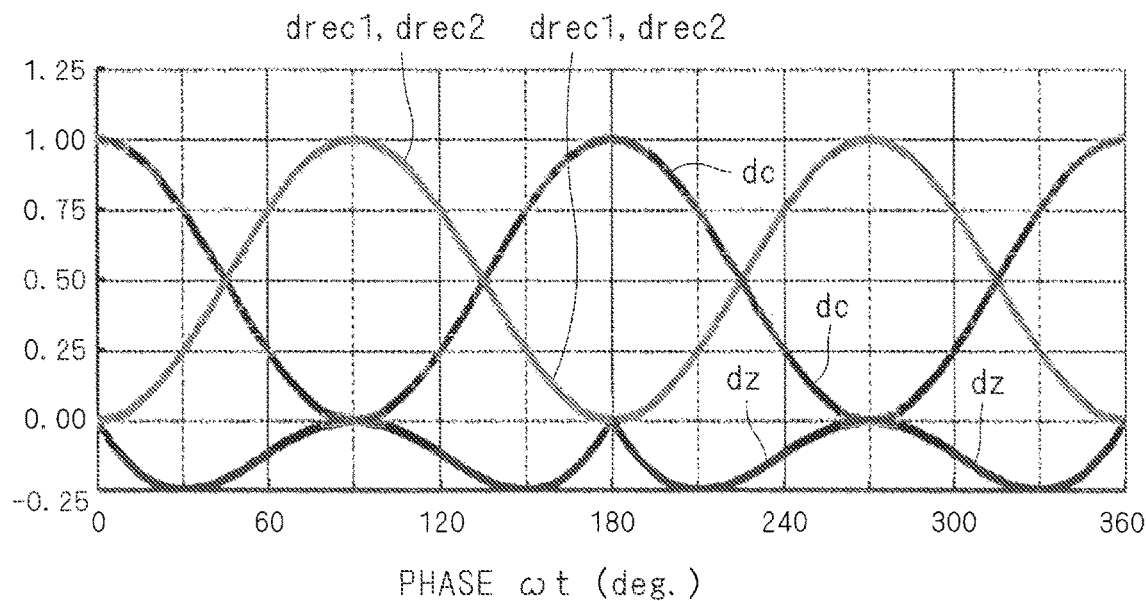

F I G. 1 9
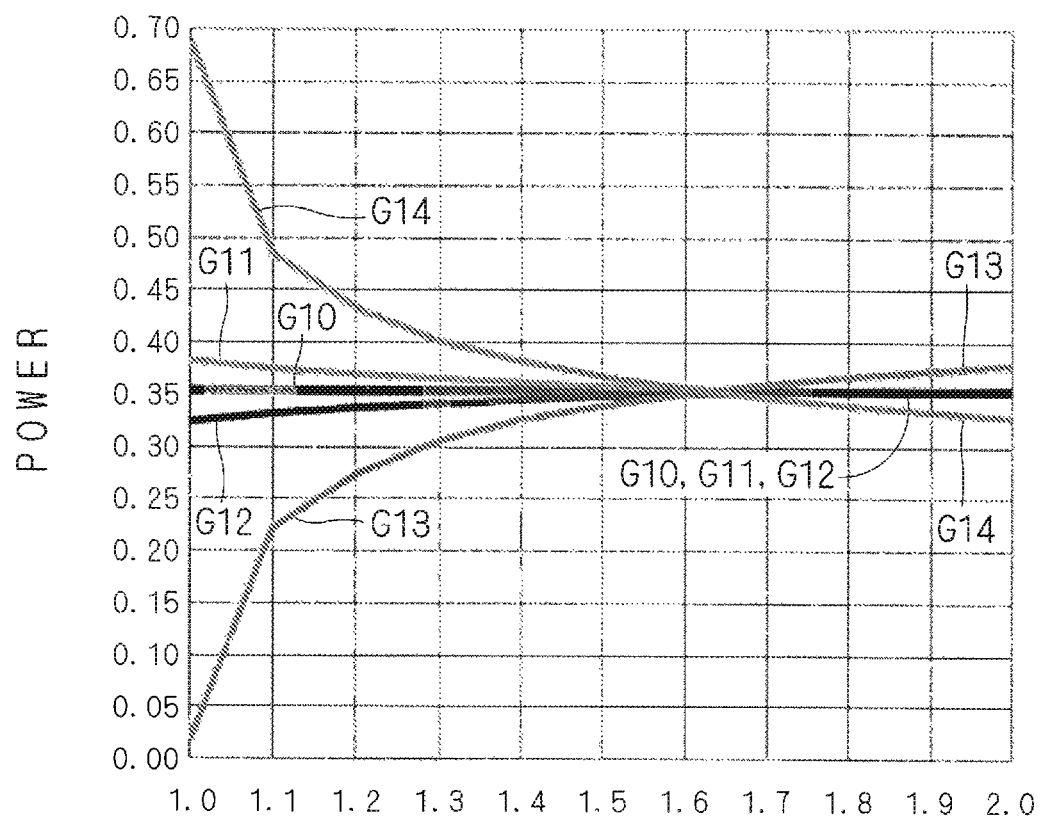

F I G . 2 1
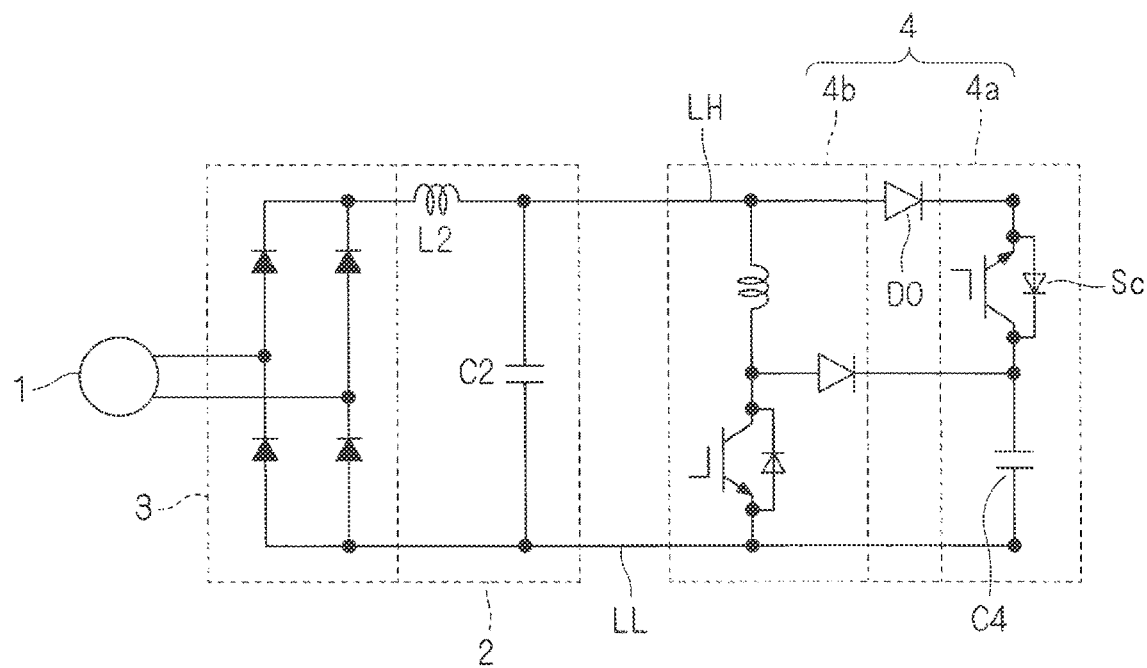

POWER CONVERTER

TECHNICAL FIELD

The present invention relates to a power converter including a power buffer circuit.

BACKGROUND ART

A full-wave rectifying circuit is typically used to obtain a DC voltage from a single-phase AC voltage input from a single-phase AC power supply. An output from the full-wave rectifying circuit, however, has power pulsations having a frequency twice the frequency of the single-phase AC voltage. To reduce the power pulsations, a power buffer circuit for buffering a power is thus required between an output of the full-wave rectifying circuit and a load. A capacitive element, for example, referred to as a smoothing capacitor is required for buffering a power.

Irie, Yamashita, and Takemoto, "Ripple Compensation for a Single-Phase Rectifier by 2-Quadrant Chopper and Auxiliary Capacitor", the Institute of Electrical Engineers of Japan (IEEJ) Transactions D, Vol. 112, No. 7, pp. 623-629 (1992) discloses a technique for connecting a buffer capacitor to a smoothing capacitor via a current-reversible chopper to absorb a pulsating power. This technique reduces the electrostatic capacitance of the smoothing capacitor and further allows voltage ripples at the buffer side to greatly reduce the total electrostatic capacitance required for smoothing.

Ohnuma, Itoh, "Circuit Configuration and Control Strategy of single-to-three Phase Power Converter with Active Buffer and Charge Circuit", the 2010 Annual Meeting of IEEJ, 4-057 (2010) and Japanese Patent Application Laid-Open No. 2011-193678 disclose a technique for connecting a buffer capacitor to a DC link via a switching element while removing the smoothing capacitor of Irie, Yamashita, and Takemoto, "Ripple Compensation for a Single-Phase Rectifier by 2-Quadrant Chopper and Auxiliary Capacitor", the Institute of Electrical Engineers of Japan (IEEJ) Transactions D, Vol. 112, No. 7, pp. 623-629 (1992). A direct conversion circuit is described that generates a voltage source by this technique and generates a high-frequency link along with a power supply voltage.

Ohnuma, Itoh, "Comparison between a Boost Chopper and an Active Buffer as a Single to Three Phase Converter", 2011 Annual Meeting of IEEJ, 4-042 (2011) further discloses a technique for converting an input waveform into a sinusoidal waveform and increasing efficiency.

The techniques described in Ohnuma, Itoh, "Circuit Configuration and Control Strategy of single-to-three Phase Power Converter with Active Buffer and Charge Circuit", the 2010 Annual Meeting of IEEJ, 4-057 (2010) and Ohnuma, Itoh, "Comparison between a Boost Chopper and an Active Buffer as a Single to Three Phase Converter", 2011 Annual Meeting of IEEJ, 4-042 (2011) improve a voltage utilization ratio (a ratio of a voltage across a DC link to a crest value of a power supply voltage) from 0.5 to $1/\sqrt{2}=0.71$, compared with the conventionally proposed technique involving the use of an active snubber (for example, see Ohnuma, Itoh, "Control Strategy of Single Phase to Three Phase Power Converter Using an Active Snubber", 2008 IEEJ Industry Applications Society Conference, 1-20 (2008)). However, the voltage across the DC link is low compared with a typical single-phase rectifier. This may increase the current capacity of a power device of an inverter.

To solve the problem above, Japanese Patent No. 5454732 proposes a technique for controlling the voltage across a DC link to have a waveform obtained by full-wave rectification of a two-phase AC and setting an average voltage utilization ratio to 0.9 at maximum.

As described above, the techniques proposed in Ohnuma, Itoh, "Circuit Configuration and Control Strategy of single-to-three Phase Power Converter with Active Buffer and Charge Circuit", the 2010 Annual Meeting of IEEJ, 4-057 (2010), Ohnuma, Itoh, "Comparison between a Boost Chopper and an Active Buffer as a Single to Three Phase Converter", 2011 Annual Meeting of IEEJ, 4-042 (2011), Japanese Patent Application Laid-Open No. 2011-193678 and Japanese Patent No. 5454732, which are based on the concept of a power flow, buffer the power pulsations by a power buffer circuit to supply a steady power to an inverter.

SUMMARY OF INVENTION

Problem to be Solved by Invention

Japanese Patent Application Laid-Open No. 2014-082926 proposes a technique for generating a voltage across a DC link using the voltage at the power supply and the voltage at the power buffer circuit. This can increase the voltage across the DC link. In view of the breakdown voltage of a capacitor used in the power buffer circuit, however, the voltage of the power buffer circuit is desirably adjusted to be not greater than 1.2 times the crest value of the power supply voltage. When the voltage of the power buffer circuit is set to such a value, the power buffer circuit mainly covers the power. In this case, the power supplied from the full-wave rectifying circuit to the inverter is an auxiliary power, and there is a trade-off between boosting the voltage across the DC link and obtaining high efficiency characteristics that are a feature of the direct power converter.

The present application therefore has an object to provide a technique for increasing the voltage across a DC link without increasing the power covered by a power buffer circuit.

Means for Solving the Problem

A power converter according to the present invention includes a DC link including a first power supply line (LH) and a second power supply line (LL), a converter (3) that receives a single-phase AC voltage (Vin) and outputs a pulsating power (Pin) to the DC link, an inverter (5) that receives a power from the DC link and outputs an AC current (Iu, Iv, Iw), and a power buffer circuit (4) that receives a charge power (Pl) from the DC link and outputs a discharge power (Pc) to the DC link.

In a first aspect, an input power (Pdc) input to the inverter (5) takes a value (Pin+Pc−Pl) obtained, from the DC link (7), by subtracting the charge power from a sum of the pulsating power and the discharge power. The charge power (Pl) takes a value (Pin/2) that is a half of the pulsating power (Pin). The discharge power (Pc) takes a value (Pinˆ+Pl) obtained by adding the charge power to an AC component (Pinˆ) of the pulsating power. The converter (3) applies a rectified voltage (Vrec) obtained by full-wave rectifying the single-phase AC voltage (Vin) to the DC link (7) while setting the first power supply line (LH) to have a higher potential than the second power supply line (LL). The power buffer circuit (4) includes a discharge circuit (4a) and a charge circuit (4b). The discharge circuit (4a) includes a capacitor (C4) and a switch (Sc, D42) connected in series to the capacitor adjacent to the first power supply line between the first power supply line and the second power supply line. The charge circuit (4b) charges the capacitor. A discharge duty (dc) that is a duty at which the switch is conductive takes a value $((Vm/Vc)\cos^2(\omega t))$ obtained by dividing a product of a crest value (Vm) of the single-phase AC voltage and a square $(\cos^2(\omega t))$ of a cosine value of a phase of the single-phase AC voltage by a both-end voltage (Vc) across the capacitor. The converter is conductive at a rectifying duty (drec). A DC voltage (Vdc) that is a sum of a product (drec·Vrec) of the rectified voltage and the rectifying duty and a product (dc·Vc) of the both-end voltage and the discharge duty varies in a period that is a half of a period of the single-phase AC voltage.

In a second aspect of the power converter according to the present invention, in the first aspect, the rectifying duty takes any one smaller value of an absolute value ($|\sin(\omega t)|$) of a sine value of the phase and a value (1−dc) obtained by subtracting the discharge duty (dc) from 1.

In a third aspect of the power converter according to the present invention, in the first aspect, the rectifying duty takes a value (1−dc) obtained by subtracting the discharge duty (dc) from 1.

In a fourth aspect of the power converter according to the present invention, in any one of the first to third aspects, a ratio (Vc/Vm) of the both-end voltage (Vc) to the crest value (Vm) is 1 or more and 1.2 or less.

In a fifth aspect of the power converter according to the present invention, in any one of the first to fourth aspects, the inverter (5) performs DC-AC conversion with a minimum value of the DC voltage (Vdc) as an upper limit.

In a sixth aspect of the power converter according to the present invention, in any one of the first to fourth aspects, the DC voltage varies with a quarter of the period of the single-phase AC voltage as a fundamental period.

In a seventh aspect of the power converter according to the present invention, in any one of the first to fourth aspects, the DC voltage varies in a pair of sections that are not adjacent to each other among sections equally dividing the period of the single-phase AC voltage into four and is constant in the other pair of sections.

Effects of the Invention

The DC voltage (Vdc) varies in a period in which the discharge duty (dc) varies. This increases a crest value/both-end voltage (Vm/Vc) that affects the discharge duty (dc) (i.e., reduces the both-end voltage (Vc)) to increase the DC voltage (Vdc). In other words, the both-end voltage (Vc) that is required for obtaining a desired DC voltage (Vdc) is reduced, thus reducing a breakdown voltage required for the capacitor (C4).

The objects, features, aspects, and advantages of the present invention will become more apparent from the following detailed description and the accompanying drawings.

BRIEF DESCRIPTION OF DRAWINGS

FIG. 1 is a block diagram showing a configuration of a direct power converter according to an embodiment;

FIG. 4 is a graph showing an operation of the direct power converter when a basic setting of duty is adopted;

FIG. 5 is a graph showing a voltage utilization ratio to a voltage ratio when the basic setting of duty is adopted;

FIG. 8 is a graph showing a rectifying duty, a discharge duty, and a zero duty when the first modification of duty is adopted and when a second modification of duty is adopted;

FIGS. 9 and 10 are graphs showing the validity of an approximation;

FIG. 11 is a graph showing the dependence of voltage utilization ratio on phase when the second modification of duty is adopted;

FIG. 12 is a graph showing the dependence of voltage utilization ratio on phase when the first modification of duty is adopted;

FIG. 15 is a graph showing the dependence of duties on phase when the basic setting of duty is used;

FIG. 16 is a graph showing the dependence of duties on phase when the first modification of duty is used and when the second modification is used;

FIG. 19 is a graph showing a ratio between two types of powers;

FIG. 21 is a circuit diagram showing a first modification;

DESCRIPTION OF EMBODIMENTS

A. Configuration of Direct Power Converter

Figure 2:
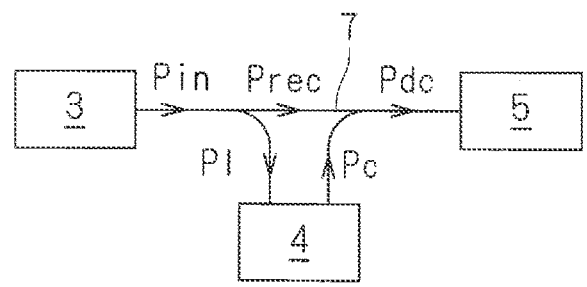
FIG. 2 is a block diagram showing a power balance in the direct power converter according to the embodiment.

FIG. 1 is a block diagram showing a configuration of a direct power converter to which a control method described in this embodiment is applied. The direct power converter includes a converter 3, a power buffer circuit 4, an inverter 5, and a DC link 7.

The converter 3 is connected with a single-phase AC power supply 1 via, for example, a filter 2. The filter 2 includes a reactor L2 and a capacitor C2. The reactor L2 is provided between the converter 3 and one of two output terminals of the single-phase AC power supply 1. The capacitor C2 is provided between the two output terminals of the single-phase AC power supply 1. The filter 2 removes the high frequency components of a current. The filter 2 may be omitted. For the sake of brevity, the following description will be made ignoring the function of the filter 2.

The DC link 7 includes DC power supply lines LH and LL.

The converter 3 uses a diode bridge, for example, and includes diodes D31 to D34. The diodes D31 to D34, which constitute a bridge circuit, convert a single-phase AC voltage Vin, which is an input voltage input from the single-phase AC power supply 1, by single-phase full-wave rectification into a rectified voltage Vrec and output it across the power supply lines LH and LL. A higher potential is applied to the DC power supply line LH than to the DC power supply line LL. An input current Iin flows into the converter 3 from the single-phase AC power supply 1.

The power buffer circuit 4 includes a discharge circuit 4a and a charge circuit 4b and provides and receives powers to and from the DC link 7. The discharge circuit 4a includes a capacitor C4, and the charge circuit 4b boosts the rectified voltage Vrec and charges the capacitor C4.

The discharge circuit 4a further includes a transistor (herein an insulated gate bipolar transistor: hereinafter abbreviated as an "IGBT") Sc connected in antiparallel to a diode D42. The transistor Sc is connected in series to the capacitor C4 adjacent to the DC power supply line LH between the DC power supply lines LH and LL. Herein, being connected in antiparallel refers to being connected in parallel with forward directions being opposite to each other. Specifically, the forward direction of the transistor Sc is a direction from the DC power supply line LL toward the DC power supply line LH, and the forward direction of the diode D42 is a direction from the DC power supply line LH toward the DC power supply line LL. The transistor Sc and the diode D42 can be collectively understood as a switch element (switch Sc). When the switch Sc is conductive, the capacitor C4 discharges to provide a power to the DC link 7.

The charge circuit 4b includes, for example, a diode D40, a reactor L4, and a transistor (herein an IGBT) Sl. The diode D40 has a cathode and an anode, and the cathode is connected between the switch Sc and the capacitor C4. This configuration is known as a so-called boost chopper.

The reactor L4 is connected between the DC power supply line LH and the anode of the diode D40. The transistor Sl is connected between the DC power supply line LL and the anode of the diode D40. The transistor Sl is connected in antiparallel with a diode D41, and they can be collectively understood as a switch element (switch S1). Specifically, the forward direction of the transistor Sl is a direction from the DC power supply line LH toward the DC power supply line LL, and the forward direction of the diode D41 is a direction from the DC power supply line LL toward the DC power supply line LH.

The capacitor C4 is charged by the charge circuit 4b, and a both-end voltage Vc higher than the rectified voltage Vrec is generated in the capacitor C4. Specifically, a current is caused to flow from the DC power supply line LH to the DC power supply line LL via the switch S1 to store energy in the reactor L4, and then the switch Sl is turned off to store the energy in the capacitor C4 via the diode D40.

Since the both-end voltage Vc is higher than the rectified voltage Vrec, no current basically flows through the diode D42. Conduction/non-conduction of the switch Sc thus solely depends on that of the transistor Sc. Herein, the diode D42 acts to achieve a reverse breakdown voltage at which the both-end voltage Vc is lower than the rectified voltage Vrec and to allow a reverse conduction of a current that is refluxed from an inductive load 6 to the DC link 7 when the inverter 5 stops due to abnormality.

Since the DC power supply line LH is higher than the DC power supply line LL in potential, no current basically flows through the diode D41. Conduction/non-conduction of the switch S1 thus solely depends on that of the transistor Sl. Although herein the diode D41 is a diode for reverse breakdown voltage and reverse conduction and is illustrated as an internal diode of the transistor Sl configured by an IGBT, the diode D41 itself is not involved in a circuit operation.

The inverter 5 converts a DC voltage across the DC power supply lines LH and LL into an AC voltage and outputs it to output terminals Pu, Pv, and Pw. The inverter 5 includes six switching elements Sup, Svp, Swp, Sun, Svn, and Swn. The switching elements Sup, Svp, and Swp are respectively connected between the DC power supply line LH and the output terminals Pu, Pv, and, Pw, and the switching elements Sun, Svn, and Swn are respectively connected between the DC power supply line LL and the output terminals Pu, Pv, and Pw. The inverter 5 comprises a so-called voltage source inverter, and includes six diodes Dup, Dvp, Dwp, Dun, Dvn, and Dwn.

The diodes Dup, Dvp, Dwp, Dun, Dvn, and Dwn are arranged with their cathodes directed toward the DC power supply line LH and their anodes directed toward the DC power supply line LL. The diode Dup is connected in parallel to the switching element Sup between the output terminal Pu and the DC power supply line LH. Similarly, the diodes Dvp, Dwp, Dun, Dvn, and Dwn are respectively connected in parallel to the switching elements Svp, Swp, Sun, Svn, and Swn. AC currents Iu, Iv, and Iw are respectively output from the output terminals Pu, Pv, and Pw and constitute a three-phase AC current. For example, IGBTs are used as the switching elements Sup, Svp, Swp, Sun, Svn, and Swn.

The inductive load 6 is a rotary machine, for example, and is shown by an equivalent circuit representing an inductive load. Specifically, a reactor Lu and a resistor Ru are connected in series to each other, and one end of the series body is connected to the output terminal Pu. The same applies to a reactor Lv and a resistor Rv and to a reactor Lw and a resistor Rw. Respective opposite ends of these series bodies are connected to one another.

When a control system is illustrated with the inductive load 6 being a synchronous machine, a velocity detector 9 detects the AC currents Iu, Iv, and Iw flowing through the inductive load 6 and, based on these currents, provides a controller 10 with a rotation angular velocity ωm, and a q-axis current Iq and a d-axis current Id.

The controller 10 receives the rotation angular velocity ωm, and the q-axis current Iq and the d-axis current Id, as well as crest values Vm and Im, a power supply angular velocity ω, and a command value ωm* of the rotation angular velocity, which will be described below, and based on voltage command values Vu*, Vv*, and Vw* (which will be described below with reference to FIG. 20), obtains signals SSup, SSvp, SSwp, SSun, SSvn, and SSwn for respectively controlling the operations of the switching elements Sup, Svp, Swp, Sun, Svn, and Swn of the inverter 5 through arithmetic processing (not shown: for example, see Japanese Patent Application Laid-Open No. 2011-193678).

The controller 10 also generates signals SSc and SSl for respectively controlling the operations of the switches Sc and Sl, which are generated based on duties drec, dc, dz, and dl (for example, see Japanese Patent Application Laid-Open No. 2011-193678).

B. Control Method (b-1) Basic Concept of Power Reduction

An instantaneous input power Pin input to the converter 3 is expressed by Formula (1) below with an input power factor being 1. Note that a crest value Vm and a power supply angular velocity ω of the single-phase AC voltage Vin, a crest value Im of the AC input current Iin, and a time t are introduced. A product ωt of the power supply angular velocity ω and the time t represents a phase of the single-phase AC voltage Vin. An AC waveform is understood as the product of a sine value of the phase ωt of the AC waveform and a crest value.

$$Pin = Vm \cdot Im \cdot \sin^2(\omega t) \quad (1)$$
$$= \frac{1}{2} Vm \cdot Im - \frac{1}{2} Vm \cdot Im \cdot \cos(2\omega t)$$

The instantaneous input power Pin has an AC component $(-\frac{1}{2}) \cdot Vm \cdot Im \cdot \cos(2\omega t)$ (hereinafter, also referred to as an "AC component Pin^") shown by the second term of the right-hand side of Formula (1). The instantaneous input power Pin is thus hereinafter also referred to as a pulsating power Pin.

The power converter shown in FIG. 1 can be understood as follows:

The DC link 7 includes the DC power supply lines LH and LL;

The converter 3 receives the single-phase AC voltage Vin and outputs the pulsating power Pin;

The power buffer circuit 4 receives a charge power Pl from the DC link 7 and outputs a discharge power Pc to the DC link 7; and The inverter 5 receives, from the DC link 7, an input power Pdc (=Pin+Pc−Pl) obtained by subtracting the charge power Pl from the sum of the pulsating power Pin and the discharge power Pc and outputs the AC currents Iu, Iv, and Iw.

FIG. 2 is a block diagram schematically showing a power balance in the direct power converter shown in FIG. 1. A power subjected to buffering (hereinafter, referred to as a "buffering power Pbuf") by the power buffer circuit 4 is equal to a power difference (Pc−Pl) obtained by subtracting the charge power Pl from the discharge power Pc. A power Prec directed from the converter 3 toward the inverter 5 is equal to Pin−Pl. Thus, Pdc=Prec+Pc holds.

In the techniques shown in Ohnuma, Itoh, "Circuit Configuration and Control Strategy of single-to-three Phase Power Converter with Active Buffer and Charge Circuit", the 2010 Annual Meeting of IEEJ, 4-057 (2010) and Japanese Patent Application Laid-Open No. 2011-193678, to counteract the above-mentioned AC component Pin^, different types of control are performed alternately for each quarter period ((¼) period) of the single-phase AC voltage Vin (such control is also referred to as "quarter-period control" for the sake of convenience). Specifically, control to set Pl=Pin^ and Pc=0 and control to set Pl=0 and Pc=−Pin^ are performed alternately for each quarter period of the single-phase AC voltage Vin. As a result, Pdc=Pin+Pc−Pl=Pin−Pin^=(½)·Vm·Im holds over a whole period, thus avoiding power pulsations. In these techniques, however, a maximum value of the voltage utilization ratio remains at 1/√2.

In the technique described in Japanese Patent No. 5454732, even if a voltage utilization ratio can be increased, the voltage across the DC link and the current flowing through the DC link are more likely to be distorted in a quarter period of the single-phase AC voltage Vin.

Thus, considered below is the control without the premise that Pl=0 and Pc=0 are set alternately for each quarter period of the single-phase AC voltage Vin.

(b-2) Specific Examples of Charge Power Pl and Discharge Power Pc

In and after this section, the above-mentioned charge power Pl and discharge power Pc are respectively determined by Formulas (2) and (3) as examples.

$$Pl = \frac{1}{2} \cdot Vm \cdot Im \cdot \sin^2(\omega t) \quad (2)$$

$$Pc = \frac{1}{2} \cdot Vm \cdot Im \cdot \cos^2(\omega t) \quad (3)$$
$$= \frac{1}{2} \cdot Vm \cdot Im \cdot \cos(2\omega t) + Pl$$

This means that the charge power Pl is a half power of the pulsating power Pin, and the discharge power Pc is a power obtained by subtracting the AC component Pin^ from the charge power Pl.

The charge power Pl can be understood as a power (½)·Pin distributed from the pulsating power Pin to the power buffer circuit 4 via the DC link 7 at a distribution ratio of ½.

From Formulas (2) and (3) and Pbuf=Pc−Pl, the buffering power Pbuf is also expressed by Formula (4).

$$Pbuf = \frac{1}{2} \cdot Vm \cdot Im \cdot \cos(2\omega t) \quad (4)$$

It is obvious that the charge power Pl and the discharge power Pc are different from those in the quarter-period control described above.

Discharge is dominant over charge in a period (hereinafter, also referred to as a "discharge dominant period") in which Pc>Pl (i.e., Pbuf>0), and charge is dominant over discharge in a period (hereinafter, also referred to as a "charge dominant period") in which Pc<Pl (i.e., Pbuf<0). As can be understood from Formulas (2) and (3), a period in which $(n+¼)\pi \le \omega t \le (n+¾)\pi$ is the charge dominant period, and a period in which $(n+¾)\pi \le \omega t \le (n+5/4)\pi$ is the discharge dominant period (n is an integer: the same applies to the description below).

The voltage utilization ratio can be set up to 1 by determining the charge power Pl and the discharge power Pc as described above, which will be described below.

(b-3) Distribution of Current

This section will describe a technique for setting a current irec1 flowing from the converter 3 to the inverter 5 out of a current irec output from the converter 3 to a half of the current irec.

The rectified voltage Vrec expressed by Formula (5) is applied to the output side of the converter 3.

$$Vrec = |Vin| = Vm \cdot |\sin(\omega t)| \quad (5)$$

Formula (6) below holds as Prec=Pin−Pl.

$$Prec = \frac{1}{2} \cdot Vm \cdot Im \cdot \sin^2(\omega t) = |Vin| \cdot irec1 \quad (6)$$

The current irec1 is thus expressed by Formula (7) below.

$$irec1 = \frac{1}{2} \cdot Im \cdot |\sin(\omega t)| \quad (7)$$

Formula (1) is based on the premise that the input current Iin is expressed by Im·sin(ωt), that is, has a sinusoidal waveform, and thus, the current il satisfies Formula (8) below. As can be seen from FIG. 2, this is because the current irec output from the converter 3 is equal to the sum of the current irec1 and the current il.

$$il = \frac{1}{2} \cdot Im \cdot |\sin(\omega t)| \quad (8)$$

When a discharge current ic flowing from the capacitor C4 to the inverter 5 is introduced, the discharge power Pc output from the power buffer circuit 4 is expressed by a product Vc·ic. In order for the discharge power Pc to satisfy Formula (3), thus, it suffices that the discharge current ic satisfies Formula (9) below.

$$ic = \frac{Pc}{Vc} = \frac{Vm \cdot \text{Im}}{2Vc} \cdot \cos^2(\omega t) \quad (9)$$

Figure 3:
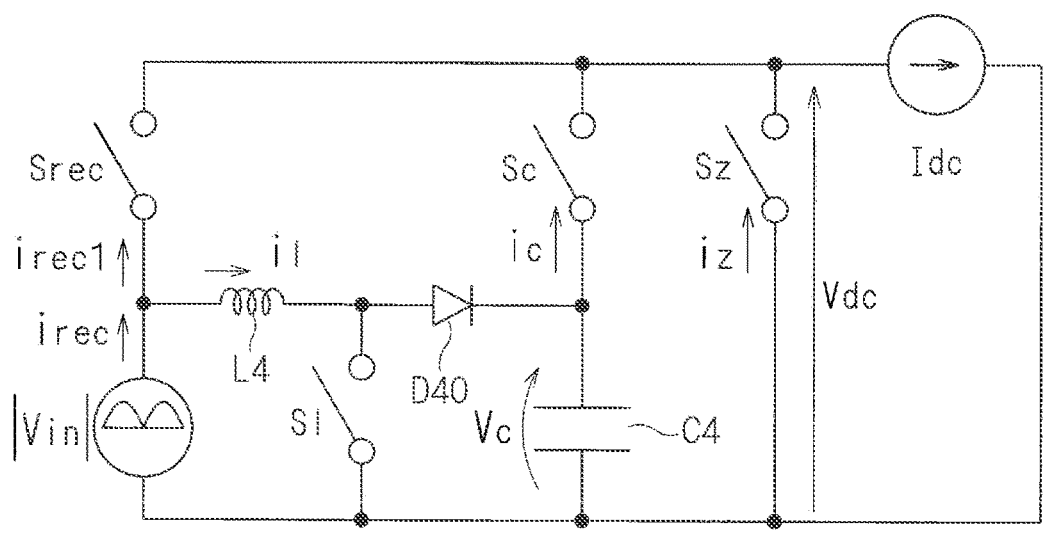
FIG. 3 is a circuit diagram showing an equivalent circuit of a circuit shown in FIG. 1.

FIG. 3 shows an equivalent circuit of the circuit shown in FIG. 1. The equivalent circuit is introduced in Japanese Patent Application Laid-Open No. 2011-193678, for example. In the equivalent circuit, the current irec1 is equivalently expressed as a current irec1 passing through a switch Srec when this switch is conductive. Similarly, the discharge current ic is equivalently expressed as a current ic passing through the switch Sc when this switch is conductive.

A current flowing through the inverter 5 to the inductive load 6 when the output terminals Pu, Pv, and Pw are connected in common to any one of the DC power supply lines LH and LL in the inverter 5 is also equivalently expressed as a zero-phase current iz flowing through a switch Sz when this switch is conductive.

FIG. 3 also shows the reactor L4, the diode D40, and the switch Sl constituting the charge circuit 4b, and additionally shows the current il flowing through the reactor L4.

In the thus obtained equivalent circuit, Formula (10) below holds by introducing the duties drec, dc, and dz at which the switches Srec, Sc, and Sz are respectively conductive and a DC current Idc input into the inverter 5.

$$\begin{bmatrix} irec \\ ic \\ iz \end{bmatrix} = \begin{bmatrix} drec & 1 \\ dc & 0 \\ dz & 0 \end{bmatrix} \cdot \begin{bmatrix} Idc \\ il \end{bmatrix} \quad (10)$$

The currents irec1, ic, and iz are respectively obtained by multiplying the DC current Idc by the duties drec, dc, and dz, and are accordingly average values in switching cycles of the respective switches Srec, Sc, and Sz.

The DC current Idc is the sum of the currents irec1, ic, and iz conducted by the respective switches Srec, Sc, and Sz, and thus, the following formula holds. Note that 0≤drec≤1, 0≤dc≤1, and 0≤dz≤1.

$$drec + dc + dz = 1 \quad (11)$$

The duties drec, dc, and dz can thus be considered as current distribution ratios of the DC current Idc to the respective currents irec1, ic, and iz. The duty drec may hereinafter also be referred to as a rectifying duty drec because it is a duty at which a period in which the converter 3 is connected to the DC link 7 and allows a current to flow through the inverter 5 is set. The duty dc may hereinafter also be referred to as a discharge duty dc because it is a duty at which the capacitor C4 discharges. The duty dz may hereinafter also be referred to as a zero duty dz because the duty dz is a duty at which the zero-phase current iz always flows through the inverter 5 regardless of a voltage output from the inverter 5.

The rectifying duty drec and the discharge duty dc are respectively set by Formulas (12) and (13) below from Formulas (7), (9), and (10).

$$drec = \frac{1}{2} \cdot \frac{\text{Im}}{Idc} \cdot |\sin(\omega t)| \quad (12)$$

$$dc = \frac{Vm}{2Vc} \cdot \frac{\text{Im}}{Idc} \cdot \cos^2(\omega t) \quad (13)$$

That is to say, Formulas (7), (9), (12), and (13) are used to meet the demand for power balance, and Formula (8) is used to further meet the demand for making the input current Iin be a sinusoidal waveform and satisfaction of Formula (1) on which the above-mentioned formulas are based.

When the converter 3 uses a diode bridge, the converter 3 cannot be actively switched at the rectifying duty drec expressed by Formula (12). By switching the inverter 5 and the switch Sc respectively in accordance with the zero duty dz and the discharge duty dc determined by Formulas (11), (12), and (13), the current irec1 expressed by Formula (7) can be obtained.

The inverter 5 cannot use the DC voltage at the DC link 7 in a period in which the zero-phase current iz flows. The DC voltage used in power supply to the inverter 5 in the DC link 7 is thus important in power conversion. In other words, the instantaneous DC voltage that is not used by the inverter 5 in power conversion is not important also in the consideration of a voltage utilization ratio. The DC voltage Vdc that is important in power conversion can thus be expressed as follows:

$$Vdc = Vrec \cdot drec + Vc \cdot dc + 0 \cdot dz \quad (14)$$

On the other hand, the DC voltage Vdc can be understood as a voltage applied to the DC link 7 as an average of the maximum value of a voltage that the inverter 5 can output, in a period in which switching of the switches Sc and Sl and the inverter 5 is controlled. This is because though the inverter 5 can contribute to the voltage across the DC link 7 at a ratio, zero duty dz, the inverter 5 is insulated from any one of the DC power supply lines LL and LH of the DC link 7 in the period corresponding to the zero duty dz.

The DC voltage Vdc is additionally shown in FIG. 3 as a voltage generated across a current source Idc (which flows the DC current Idc) representing the inverter 5 and a load thereof.

The input power Pdc input from the DC link 7 to the inverter 5 is the product of the DC voltage Vdc and the DC current Idc. Since the inverter 5 obtains, from the DC link 7, the input power Pdc (=Pin+Pc−Pl) obtained by subtracting the charge power Pl from the sum of the pulsating power Pin and the discharge power Pc, Formula (15) below holds.

$$Idc = \frac{Pin + Pc - Pl}{Vdc} \quad (15)$$
$$= \frac{Vm \cdot \text{Im}}{2Vdc}$$

Formulas (12) and (13) can be expressed as Formulas (16) and (17).

$$drec = \frac{Vdc}{Vm}|\sin(\omega t)| \quad (16)$$
$$= \frac{Vdc}{Vrec} \cdot \sin^2(\omega t)$$

$$dc = \frac{Vdc}{Vc} \cdot \cos^2(\omega t) \quad (17)$$
$$= \frac{Vdc}{2Vc}(1 + \cos(2\omega t))$$

When the right-hand side of Formula (14) is calculated using Formulas (16) and (17), Formula (18) below is obtained, which matches the left-hand side of Formula (14).

$$drec \cdot Vrec + dc \cdot Vc = Vdc|\sin(\omega t)| \cdot |\sin(\omega t)| + Vdc \cdot \cos^2(\omega t) \quad (18)$$
$$= Vdc$$

In other words, it can be said that the rectifying duty drec and the discharge duty dc are respectively determined by Formulas (16) and (17) as a result of the determination of one DC voltage Vdc.

It is found from the forms of the functions of Formulas (16) and (17) or from the maximum values of the rectifying duty drec and the discharge duty dc being 1 that the DC voltage Vdc can be controlled at a constant value if Vdc≤Vm and Vdc≤Vc. On this occasion, the rectifying duty drec can be determined by measuring a crest value Vm and designating one command value of the DC voltage Vdc.

The voltage utilization ratio can be expressed as a ratio R (=Vdc/Vm) of a DC voltage Vdc to a crest value Vm. Formulas (10), (11), and (14) reveal that the period in which the inverter 5 flows a zero-phase current is made shorter as the zero duty dz is made smaller, resulting in a longer period in which the voltage applied to the DC link is used. This increases the voltage utilization ratio R.

Based on the premise that the input current Iin is expressed by Im·sin(ωt), that is, has a sinusoidal waveform, the current i1 depends on the DC current Idc and satisfies Formula (19) below. Herein, Formulas (7) and (15) are taken into account.

$$i1 = Im \cdot |\sin(\omega t)| - drec \cdot Idc \quad (19)$$
$$= \left(Im - \frac{Vdc}{Vm} \cdot Idc\right) \cdot |\sin(\omega t)|$$
$$= \frac{Im}{2} \cdot |\sin(\omega t)| = irec1$$

That is to say, as in Formula (8), a half of the absolute value of the input current Iin flows as a current i1. It is therefore understood that the rectifying duty drec and the discharge duty dc are determined such that the input current Iin has a sinusoidal waveform.

FIG. 4 is a graph showing the operation of the direct power converter at Vc=1.5 Vm when the rectifying duty drec and the discharge duty dc are respectively set by Formulas (16) and (17) as described above while maintaining dz≥0 in a whole section of the phase ωt (this corresponds to a "basic setting of duty", which will be described below: for example, see Japanese Patent Application Laid-Open No. 2015-084637).

In FIG. 4, the first tier shows the duties drec, dc, and dz, the second tier shows the DC voltage Vdc, a first component drec·Vrec and a second component dc·Vc thereof, and the DC current Idc, the third tier shows the current irec (equal to the absolute value of the input current Iin) output from the converter 3 and the currents irec1, i1, and ic, and the fourth tier shows the powers Pin, Pc, Pbuf, and Prec. In each of the graphs, the horizontal axis represents the phase ωt with "degree" as the unit.

The first component drec·Vrec of the DC voltage Vdc is a voltage appearing in the first term of Formula (14) and indicates the contribution of the converter 3 to the DC voltage Vdc. The second component dc·Vc of the DC voltage Vdc is a voltage appearing in the second term of Formula (14) and indicates the contribution of the capacitor C4 to the DC voltage Vdc.

Herein, voltage is normalized by the crest value Vm, and the DC current Idc is converted with the crest value Im of the input current Iin being √2.

Since the lower limit of the zero duty dz is zero, the duties drec and dc at which the DC voltage Vdc is maximized are obtained when the zero duty dz is zero.

If the zero duty dz is zero, Formula (20) is obtained from Formulas (11), (16), and (17). Herein x=|sin(ωt)| is introduced.

$$drec + dc = \frac{Vdc}{Vm} \cdot x + \frac{Vdc}{Vc} \cdot (1 - x^2) = 1 \quad (20)$$

Formula (21) is obtained by transforming Formula (20).

$$Vdc = \frac{1}{\frac{x}{Vm} + \frac{1-x^2}{Vc}} = \frac{Vm}{x + \frac{Vm}{Vc}(1-x^2)} \quad (21)$$

The phase ωt providing a maximum value of the DC voltage Vdc provides a minimum value of a denominator of the right-hand side of Formula (21). Therefore, such a phase ωt is obtained as the phase ωt in which a value of Formula (22) indicating a derivative of the denominator is zero.

$$\frac{d}{d(\omega t)}\left[|\sin(\omega t)| + \frac{Vm}{Vc}(1 - \sin^2(\omega t))\right] = \cos(\omega t) \cdot \left[1 - \frac{2Vm}{Vc}\sin(\omega t)\right] \quad (22)$$

In this case, x=Vc/(2·Vm). For example, in the above-mentioned example, it is understood that the maximum value of the DC voltage Vdc that is constant is approximately 0.96 Vm because Vc=1.5 Vm. Formula (15) reveals that the DC current Idc is 0.9612 times the crest value Im.

The adoption of a distribution ratio ½ as described above can fix the respective duties in accordance with Formulas (11), (12), and (13) and set the DC voltage Vdc constant. Moreover, it is revealed that by reducing the zero duty dz, the voltage utilization ratio R is α/(1+α·α/4) (α=Vc/Vm: hereinafter referred to as a "voltage ratio α") in Formula (21) by setting x=Vc/(2·Vm).

The voltage utilization ratio R=α/(1+α·α/4) is greater than the voltage utilization ratio (1/√2) introduced in Ohnuma, Itoh, "Circuit Configuration and Control Strategy of single-to-three Phase Power Converter with Active Buffer and Charge Circuit", the 2010 Annual Meeting of IEEJ, 4-057 (2010) and Japanese Patent Application Laid-Open No. 2011-193678, and thus, the condition that the voltage ratio α should satisfy is 2√2-2<α<2√2+2. The both-end voltage Vc is charged to be higher than the crest value Vm, and the voltage ratio α is greater than 1. To set the DC voltage Vdc constant, Vc/Vm≤2 from x=|sin(ωt)|=α/2. The condition is thus satisfied, yielding a voltage utilization ratio R greater than the voltage utilization ratio (1/√2) introduced in Ohnuma, Itoh, "Circuit Configuration and Control Strategy of single-to-three Phase Power Converter with Active Buffer and Charge Circuit", the 2010 Annual Meeting of IEEJ, 4-057 (2010) and Japanese Patent Application Laid-Open No. 2011-193678.

It is understood that the voltage utilization ratio R takes a maximum value, 1, when a value obtained by differentiating the voltage utilization ratio R with respect to the ratio α is zero, that is, α=2. That is to say, the maximum value, 1, can be obtained as the voltage utilization ratio R by setting the both-end voltage Vc to be twice the crest value Vm.

However, increasing the both-end voltage Vc requires increasing the breakdown voltage of the capacitor C4. For example, in the use of an electrolytic capacitor having a breakdown voltage of 400 V, which is used in a 200 V system, if a derating is set to 0.9 and an effective value of the power supply voltage is 230 V, $\alpha=400/(230\times\sqrt{2})\times 0.9=1.11$. If derating is set to 0.95, α=1.17. Further, when the fact that the power supply voltage increases by 10% is taken into account, the electrolytic capacitor having a breakdown voltage of 450 V is used, and α is 1.13 to 1.19 (a derating is 0.9 to 0.95).

FIG. 5 is a graph showing a voltage utilization ratio R to a voltage ratio α. It is indicated that the both-end voltage Vc needs to be increased to increase the voltage utilization ratio R as described above. For example, R remains at approximately 0.87 if α=1.17.

Figure 6:
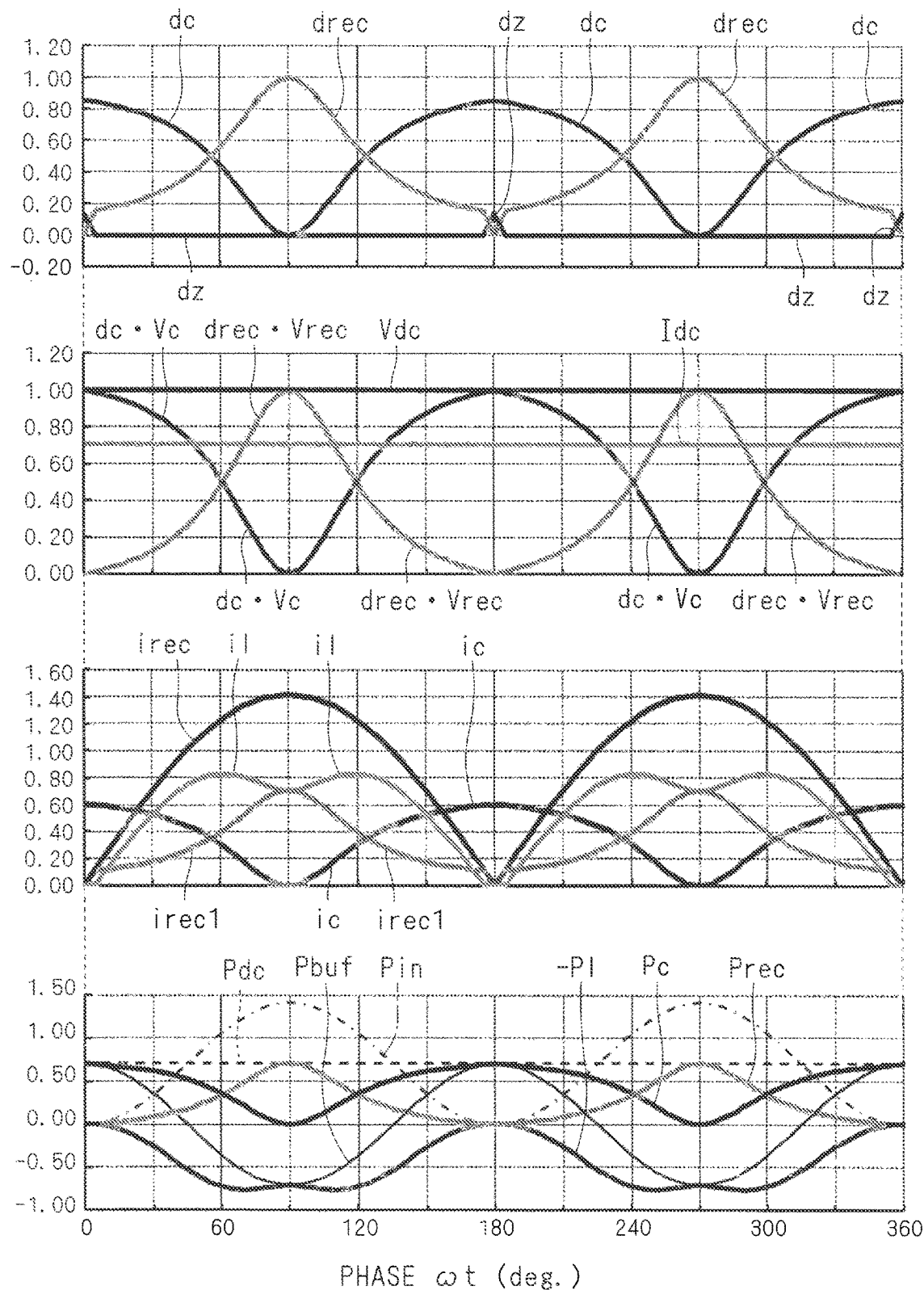
FIG. 6 is a graph showing an operation of the direct power converter when the technique described in Japanese Patent Application Laid-Open No. 2014-082926 is used.

FIG. 6 is a graph showing the operation of the direct power converter when the technique described in Japanese Patent Application Laid-Open No. 2014-082926 is used, and the quantities are shown as in FIG. 4. Herein, α=1.17. In the technique described in Japanese Patent Application Laid-Open No. 2014-082926, the voltage utilization ratio R is set to 1 (i.e., Vdc=Vm) even when a is approximately 1.17, and the DC current Idc increases up to $1/\sqrt{2}$ of the crest value Im of the input current Iin.

In the technique described in Japanese Patent Application Laid-Open No. 2014-082926, though the DC voltage Vdc increases up to the crest value Vm, the current il is large and the current irec1 is small compared with the graph of FIG. 4. It is therefore revealed that the charge power Pl is large (power (−Pl) is shown in the graph) and the power Prec is small. This is disadvantageous from the viewpoint of increasing efficiency, as described above.

(b-4) Correction of Duties

Then, the rectifying duty drec and the discharge duty dc are corrected to increase the voltage utilization ratio R at a low voltage ratio α without increasing the charge power Pl. Unlike in the previous section, this correction does not make the current irec1 be a half of the current irec.

First, values obtained using the crest value Vm as the DC voltage Vdc respectively in Formulas (16) and (17) are adopted as the rectifying duty drec and the discharge duty dc. This corresponds to the use of the crest value Vm as the command value Vdc*.

The rectifying duty drec is passively determined in accordance with the zero duty dz and the discharge duty dc. The sum of the rectifying duty drec and the discharge duty dc exceeding 1 is contrary to Formula (11) (because dz≥0).

If the sum of the rectifying duty drec and the discharge duty dc exceeds 1, the rectifying duty drec is determined by setting the zero duty dz to 0.

That is to say, the rectifying duty drec is set to any smaller one of a value obtained by setting Vdc=Vm in Formula (16) (hereinafter referred to as a "first correction value") and a value obtained by subtracting the discharge duty dc (this is a value obtained by setting Vdc=Vm in Formula (17)) from 1 (hereinafter referred to as a "second correction value"). Such a setting will be referred to as a "first modification of duty" below. In the first modification of duty, the zero duty dz is 0 when the rectifying duty drec is set to the second correction value.

Setting the rectifying duty drec and the discharge duty dc from Formulas (16) and (17) while keeping a minimum value of the zero duty dz to zero or more will be referred to as a "basic setting of duty".

Adoption of the first modification of rectifying duty decreases the first component drec·Vrec more than in the adoption of the basic setting of duty. Formula (18) thus does not hold. The resultant DC voltage Vdc is equal to or smaller than the command value Vdc*=Vm.

Specifically, the DC voltage Vdc pulsates at the command value Vdc*=Vm or less. The DC current Idc is inversely proportional to the DC voltage Vdc (see Formula (15)) and accordingly pulsates in opposite phase to the pulsations of the DC voltage Vdc.

However, at the same voltage ratio α, a minimum value of the DC voltage Vdc obtained through pulsations is higher than the DC voltage Vdc obtained with reference to Ohnuma, Itoh, "Circuit Configuration and Control Strategy of single-to-three Phase Power Converter with Active Buffer and Charge Circuit", the 2010 Annual Meeting of IEEJ, 4-057 (2010) or Japanese Patent Application Laid-Open No. 2011-193678, thus increasing the voltage utilization ratio R.

Figure 7:
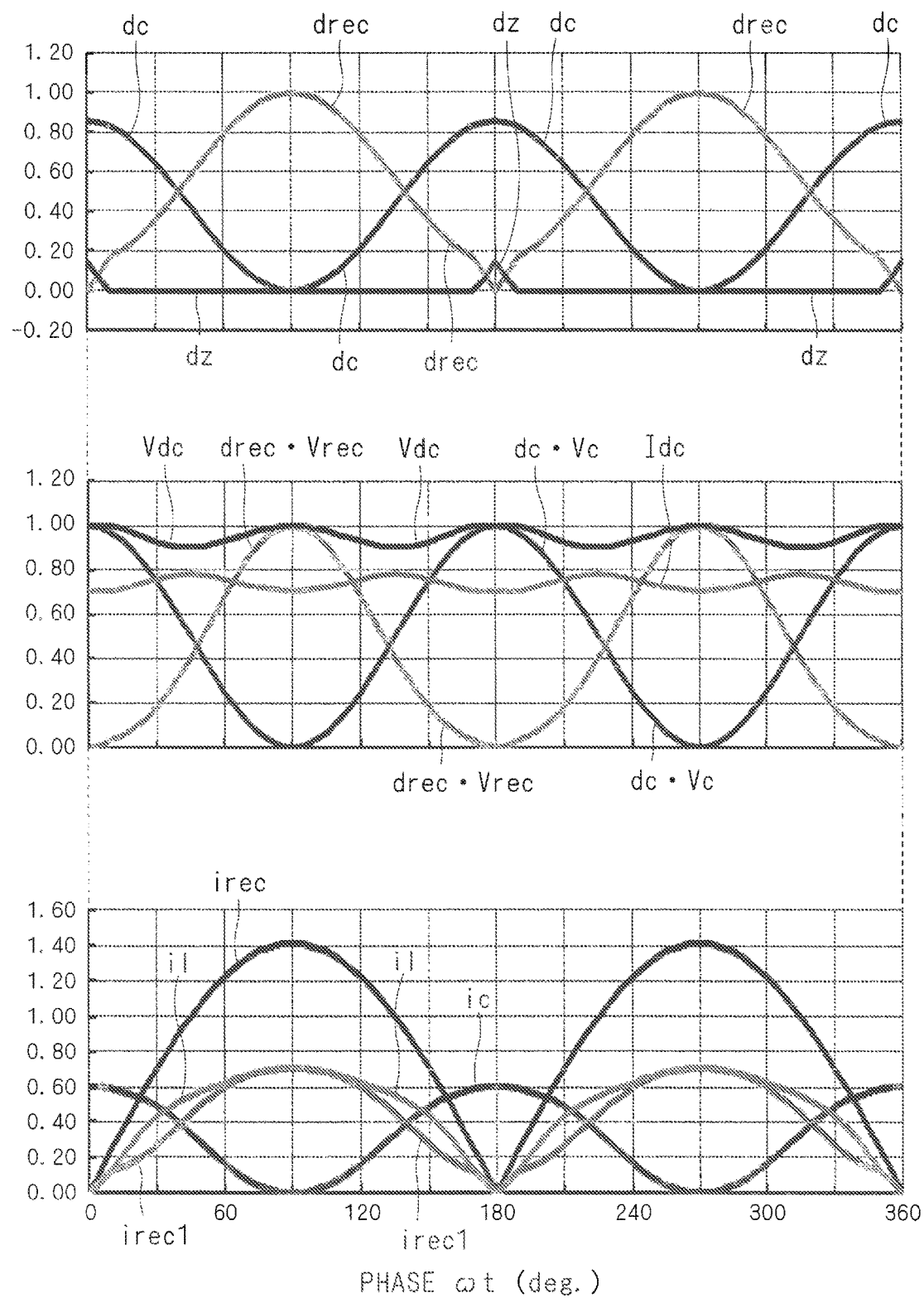
FIG. 7 is a graph showing an operation of the direct power converter when a first modification of duty is adopted.

FIG. 7 is a graph showing the operation of the direct power converter when the first modification of duty is adopted, and the quantities are shown as in FIG. 4. Herein, α=1.17.

It is revealed that the adoption of the first modification of rectifying duty as described above yields Vdc=0.95 Vm on average, and the voltage utilization ratio R=0.95 even if α=1.17. This means that improvements were obtained greatly in view of the fact that only R=0.87 was obtained at α=1.17 when the basic setting of duty was used.

Formulas (16) and (17) reveal that as the rectifying duty drec and the discharge duty dc (even when Vdc=Vm is set), a value folded back symmetrically about a phase of 45 degrees is adopted in phases of 0 to 90 degrees, a value folded back symmetrically about a phase of 135 degrees is adopted in phases of 90 to 180 degrees, a value folded back symmetrically about a phase of 225 degrees is adopted in phases of 180 to 270 degrees, and a value folded back symmetrically about a phase of 315 degrees is adopted in phases of 270 to 360 degrees.

The reason why the voltage utilization ratio R is improved as described above will be described below step by step.

For the sake of brevity, the case in which the rectifying duty drec is always set to the second correction value will be described first. Such a setting will be referred to as a "second modification of duty" below. Description will be given of the fact that especially at a small voltage ratio α (≥1), the result obtained in the second modification of duty is almost the same as the result obtained in the first modification of duty.

The zero duty dz in FIG. 7 is positive only in the neighborhood of the phases of 0, 180, and 360 degrees and is zero at the other degrees. The first correction value is small during the period in which the zero duty dz is positive and differs little from that in the case in which the second correction value is adopted.

FIG. 8 is a graph showing the rectifying duty drec, the discharge duty dc, and the zero duty dz when the first modification of duty is adopted and when the second modification of duty is adopted. As in FIG. 7, α=1.17. The rectifying duty drec set in the first modification of duty is indicated by a waveform drec1, and the rectifying duty drec set in the second modification of duty is indicated by a waveform drec2.

Herein, the zero duty dz is a value calculated by Formula (11) when the first correction value is always set to the rectifying duty drec.

During the period in which the zero duty dz is positive, for the first component drec·Vrec, a difference between the first component drec·Vrec obtained in the first modification of rectifying duty and the first component drec·Vrec obtained in the second modification of rectifying duty is small because the rectified voltage Vrec is also small. A difference in the DC voltage Vdc determined by Formula (14) is also small.

Even when the rectifying duty drec is set in the second modification of rectifying duty using the quantities used to obtain FIG. 7, a difference in waveform that is shown in the middle tier of FIG. 7 is not visually confirmed.

The DC voltage Vdc obtained by Formula (14) will now be described. Focusing on the second correction value of the rectifying duty drec being (1−dc), from Formula (14), the DC voltage Vdc is calculated by Formula (23) below.

$$Vdc = (1 - dc) \cdot Vrec + dc \cdot Vc \quad (23)$$

$$= Vm \cdot |\sin(\omega t)| + \frac{Vm}{Vc}\cos^2(\omega t) \cdot (Vc - Vm \cdot |\sin(\omega t)|)$$

$$= Vm \cdot |\sin(\omega t)| + Vm \cdot \cos^2(\omega t) - \frac{Vm^2}{Vc}\cos^2(\omega t) \cdot |\sin(\omega t)|$$

$$= Vm + Vm \cdot |\sin(\omega t)| \cdot \left(1 - |\sin(\omega t)| - \frac{1}{\alpha}\cos^2(\omega t)\right)$$

From the function form of Formula (23), an average value of the DC voltage Vdc is obtained by substituting a value π/4 into the phase ωt in Formula (23). For example, if 1.17 is adopted as the voltage ratio α, Vdc≈0.952 Vm. An average voltage utilization ratio R is thus 0.952, revealing that it is higher than R=0.87 shown in FIG. 5.

The conceivable reason why the voltage utilization ratio R can be increased as described above is that the pulsations of the DC voltage Vdc are allowed. Then, the behavior of the pulsations will be considered. A pulsating component ΔV of the DC voltage Vdc is expressed by Formula (24) below.

$$\Delta V = Vdc - Vm \quad (24)$$

$$= Vm \cdot |\sin(\omega t)| \cdot \left(1 - |\sin(\omega t)| - \frac{1}{\alpha}\cos^2(\omega t)\right)$$

As described above, the voltage ratio α is desirably smaller in view of the breakdown voltage of the capacitor C4, and thus, the voltage ratio α is approximated to 1. Formula (24) is approximated by Formula (25) below.

$$\Delta V \approx Vm \cdot |\sin(\omega t)| \cdot (-|\sin(\omega t)| + \sin^2(\omega t)) = \quad (25)$$

$$Vm \cdot \frac{1 - \cos(2\omega t)}{2}(|\sin(\omega t)| - 1)$$

Further, the approximate expression of Formula (26) is introduced.

$$|\sin(\omega t)| \approx \sin^2(\omega t) \quad (26)$$

The pulsating component ΔV is thus approximated by Formula (27) from Formulas (25) and (26).

$$\Delta V \approx Vm \cdot \frac{1 - \cos(2\omega t)}{2} \cdot (-1) \cdot \frac{1 + \cos(2\omega t)}{2} = \quad (27)$$

$$-\frac{Vm}{4} \cdot (1 - \cos^2(\omega t)) = \frac{Vm}{4} \cdot (\cos(4\omega t) - 1)$$

It is revealed that the DC voltage Vdc pulsates at a frequency four times the frequency (hereinafter referred to as a "power supply frequency") of the single-phase AC voltage Vin in this manner.

FIGS. 9 and 10 are graphs showing the validity of the approximation from Formula (25) to Formula (27). In FIGS. 9 and 10, a waveform G1 indicates a function (½)(1−cos(2ωt)). In FIG. 9, a waveform G2 indicates a function (|sin(ωt)|−1), and a waveform G3 indicates a function (½)(1−cos(2ωt))·(|sin(ωt)|−1). In FIG. 10, a waveform G4 indicates a function (−1)·(1+cos(2ωt))/2, and a waveform G5 indicates a function (½)(1−cos(2ωt))·(−1)·(1+cos(2ωt))/2.

It is revealed that the waveform G3 corresponding to Formula (25) closely resembles the waveform G5 corresponding to Formula (27) and that the introduction of the approximation of Formula (26) is valid.

Formula (27) reveals that the pulsating component ΔV pulsates in a quarter period of the single-phase AC voltage Vin. The pulsating component ΔV has a maximum value, 0, and takes values equal to or smaller than 0. In other words, it can be said that the voltage utilization ratio R is improved by the DC voltage Vdc pulsating in the quarter period and having a crest value Vm as its maximum value.

The approximation of Formula (25) cannot be said to be valid if the voltage ratio α is high. The influence of the voltage ratio α on the DC voltage Vdc including the influences of the first and second modifications of duty will be described below.

FIGS. 11 and 12 are graphs showing the dependence of the voltage utilization ratio R on phase, showing a plurality of waveforms with different voltage ratios α. FIG. 11 shows the case in which the second modification of duty is adopted, and FIG. 12 shows the case in which the first modification of duty is adopted.

The ratio of the DC voltage Vdc to the crest value Vm is the voltage utilization ratio R as described above, and thus, the pulsations of the voltage utilization ratio R are directly proportional to those of the DC voltage Vdc.

The waveforms of FIG. 12 are waveforms obtained by clamping the waveforms of FIG. 11 at R≥1 to R=1. This is because the phase domain in which R≥1 with the waveforms of FIG. 11 corresponds to the case in which the rectifying duty drec takes the first correction value, that is, the case in which dz≥0.

The comparison between FIGS. 11 and 12 reveals that there is no significant difference between the adoptions of the first and second modifications of duty at a voltage ratio α of 1 to 1.2 and that the waveforms are sinusoidal waveforms that pulsate in the quarter period.

Conversely, if the voltage ratio α is approximately 1.5, the waveform of the DC voltage Vdc is distorted greatly from the sinusoidal waveform.

Figure 13:
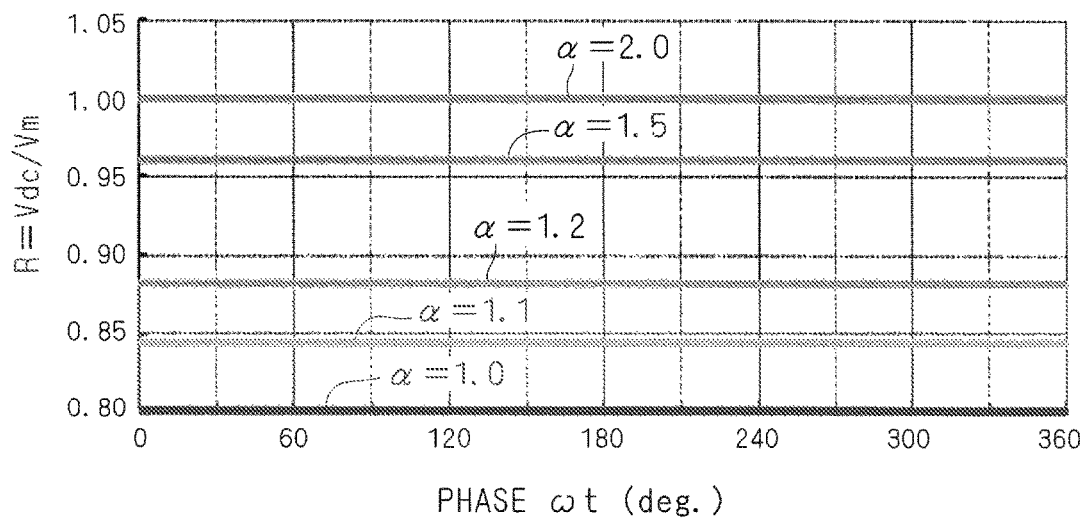
FIG. 13 is a graph showing the dependence of voltage utilization ratio on phase when the basic setting of duty is adopted.

For reference, FIG. 13 shows a graph showing the dependence of the voltage utilization ratio R on phase when the basic setting of duty is adopted. In such a case, the DC voltage Vdc is constant. The case in which α=1.5 in FIG. 13 corresponds to the graph of the quantities in FIG. 4. The DC voltage Vdc takes a constant value in FIG. 4, which also appears in FIG. 13.

The dependence of the voltage utilization ratio R on the voltage ratio α, appearing in FIG. 13, has been shown in FIG. 5.

(b-5) Comparison Between Results

Figure 14:
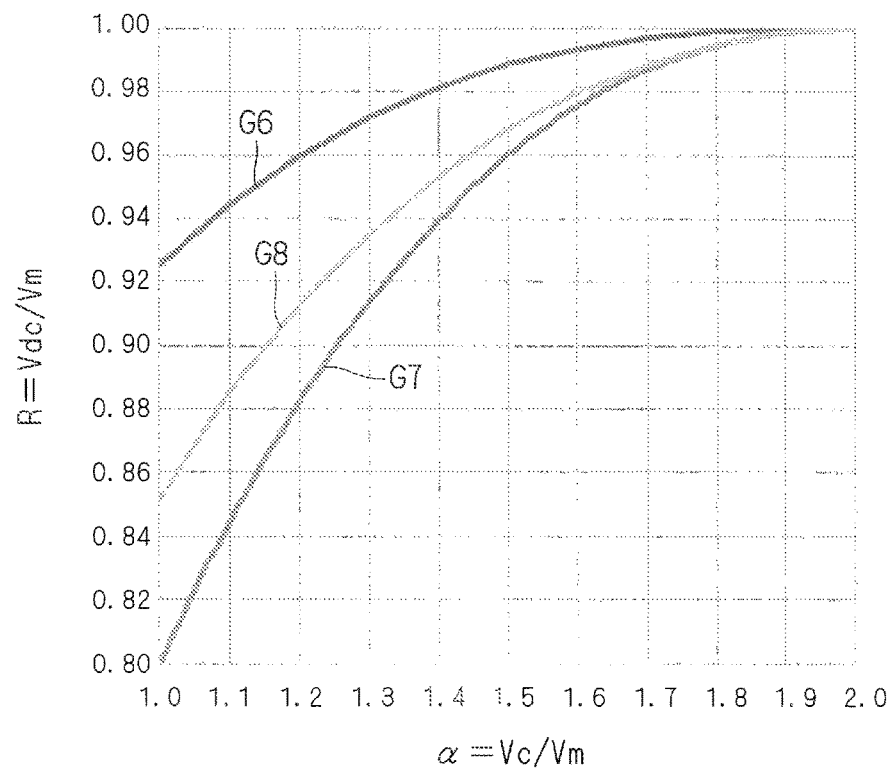
FIG. 14 is a graph showing the dependence of a voltage utilization ratio R on a voltage ratio α.

FIG. 14 is a graph showing the dependence of the voltage utilization ratio R on the voltage ratio α. A waveform G7 indicates the same details as those of the graph shown in FIG. 5.

A waveform G6 indicates an average value of the voltage utilization ratio R when the first modification of duty is adopted. An average value, 0.952 Vm, of the DC voltage Vdc obtained from Formula (23) by adopting 1.17 as the voltage ratio α reveals that an average value of the voltage utilization ratio R takes a value 0.952. This means that the waveform G6 nearly matches the voltage utilization ratio R indicated at α=1.17. It is revealed that if the voltage ratio α is around 1, as described above, there is no significant difference between the adoptions of the first and second modifications of duty. Since the waveform G6 indicates a greater voltage utilization ratio R than the waveform G7 (at the same voltage ratio α), it is revealed that the voltage utilization ratio R is made higher when the first modification of duty is adopted than when the basic setting of duty is adopted. At a voltage ratio α of approximately 1 to 1.2 that is desirable from the viewpoint of the breakdown voltage of the capacitor C4, the voltage utilization ratio R is improved by approximately 0.03 to 0.04.

This is because when the first or second modification of duty is adopted, due to the fact that the second correction value is determined, Vdc=Vm is set in Formula (17) as the discharge duty dc; when the basic setting of duty is adopted, the discharge duty dc is directly proportional to the DC voltage Vdc as in Formula (17), and is accordingly directly proportional to the voltage ratio (1/α).

When the basic setting of duty is adopted as described above, the discharge duty dc becomes greater as the voltage ratio α is smaller, and the voltage utilization ratio R decreases remarkably. In contrast, when the first modification of duty is adopted (and when the second modification of duty is adopted in the domain with a small voltage ratio α), the DC voltage Vdc takes the crest value Vm almost for each phase π/2, resulting in a greater average value of the DC voltage Vdc. A difference between the waveforms G6 and G7 is more remarkable as the voltage ratio α is smaller.

FIGS. 15 and 16 are graphs showing the dependence of duties on phase, where voltage ratio α is set to 1. FIG. 15 shows the case in which basic setting of duty is used, and FIG. 16 shows the case in which first modification of duty is used and the case in which the second modification of duty is used.

The same quantities as those in FIG. 16 have already been shown in FIG. 8. FIG. 8 shows the case of the voltage ratio α=1.17, where there is a difference between the waveforms drec1 and drec2. FIG. 16, however, shows the case of the voltage ratio α=1, and no difference is visually confirmed between these waveforms. Thus, when the zero duty dz is shown in accordance with Formula (11) in FIG. 16, its value is equal to or smaller than zero in almost all the phases.

As is obvious from the comparison between FIGS. 15 and 16, when the basic setting of duty is adopted, the discharge duty dc is greater at a smaller voltage ratio α. This incurs a decrease in voltage utilization ratio R as described above.

Referring back to FIG. 14, a waveform G8 shows the dependence of the voltage utilization ratio R obtained using the minimum value of the DC voltage Vdc on the voltage ratio α in the first modification of duty. That is to say, it is revealed that not with an average value but even with a minimum value of the DC voltage Vdc that pulsates, the voltage utilization ratio R is made higher when the first modification of duty is adopted than when the basic setting of duty is adopted.

Obtaining the voltage utilization ratio R using the minimum value of the DC voltage Vdc has the following meaning. That is to say, a modulation factor of the inverter 5 is set to V*/Vdc by introducing the command value V* of an amplitude of a voltage output from the inverter 5. This enables control of a modulation factor in which the pulsations of the DC voltage Vdc have been compensated.

When the command value V* reaches a minimum value of the DC voltage Vdc, the modulation factor is subjected to amplitude modification. Thus, the voltage utilization ratio R using the minimum value of the DC voltage Vdc applies to the voltage utilization ratio R of the DC voltage Vdc used by the inverter 5. In other words, the inverter 5 can perform DC/AC conversion with the minimum value of the DC voltage Vdc as its upper limit.

Figure 17:
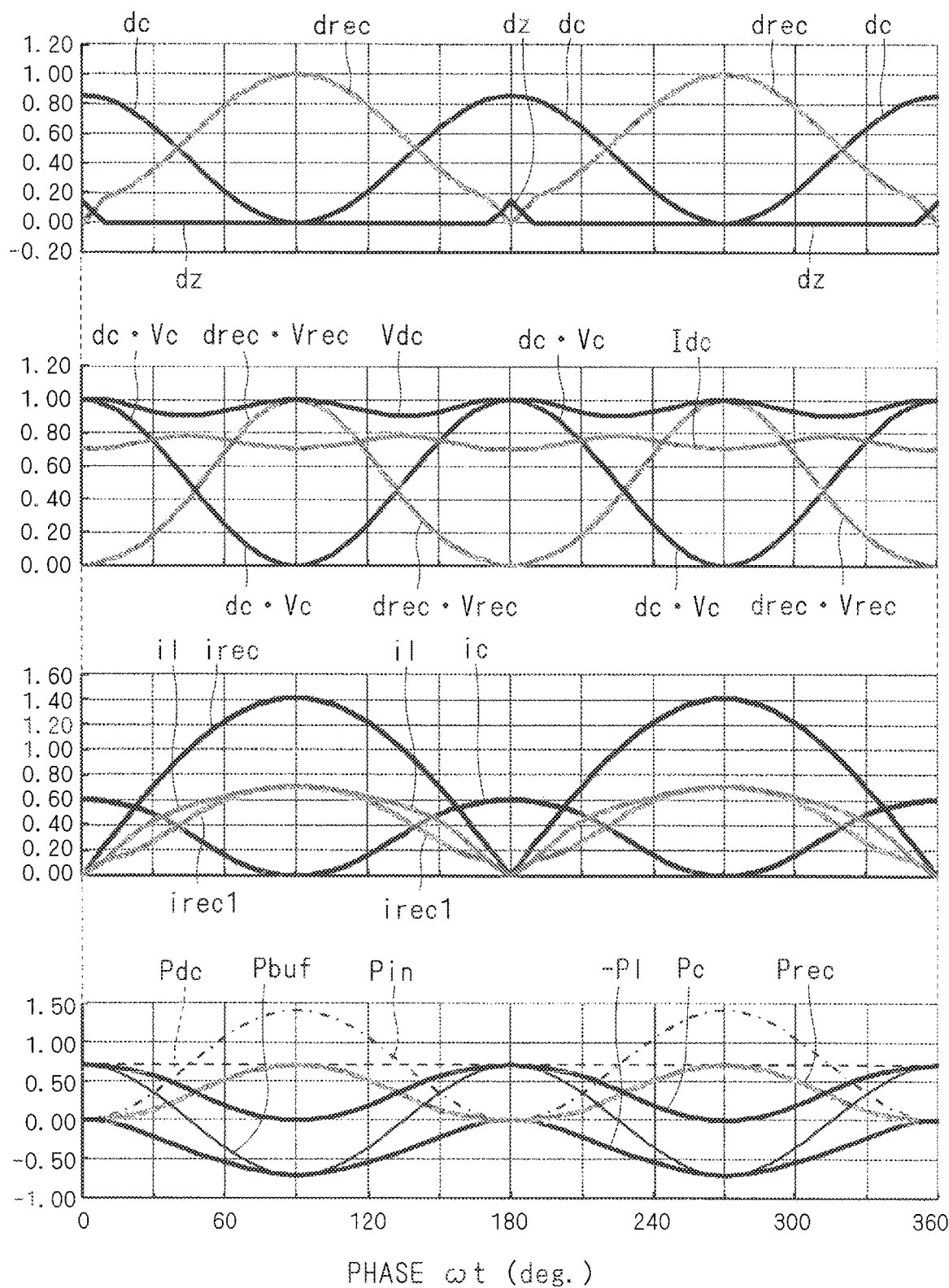
FIG. 17 is a graph showing an operation of the direct power converter when the first modification of duty is adopted.
Figure 18:
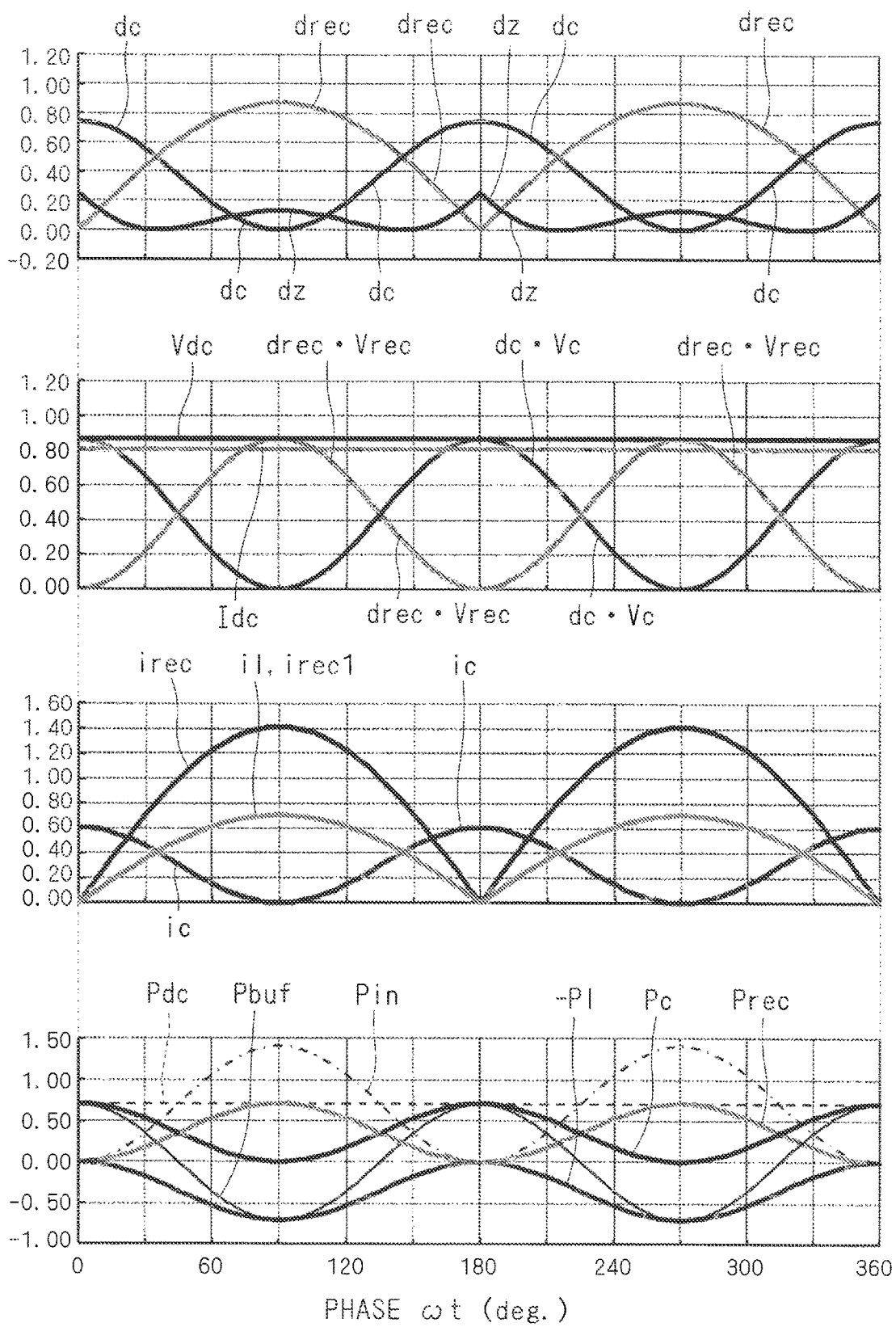
FIG. 18 is a graph showing an operation of the direct power converter when the basic setting of duty is adopted.

FIGS. 17 and 18 are graphs showing an operation of the direct power converter as in FIG. 6 and show the quantities as in FIG. 4. A common value, 1.17, is adopted as the voltage ratio α in FIGS. 6, 17, and 18. FIG. 6 shows the case in which the technique described in Japanese Patent Application Laid-Open No. 2014-082926 is adopted, while FIG. 17 shows the case in which the first modification of duty is adopted. Although the DC voltage Vdc becomes smaller when the first modification of duty is adopted by an amount of the pulsations of the DC voltage Vdc than when the technique described in Japanese Patent Application Laid-Open No. 2014-082926 is adopted, it can be seen that the current il is small and efficiency is high.

FIG. 18 shows the case in which the DC voltage Vdc is made constant using the basic setting of duty, and R remains at approximately 0.87 if α=1.17 as described with reference to FIG. 5 (as also indicated by the waveform G7 of FIG. 14).

FIG. 19 is a graph showing the ratio between the power Prec (from the converter 3 toward the inverter 5) and the charge power Pl (input to the power buffer circuit 4). An input power Pdc (=(½)·Vm·Im) expressed by the first term of the left-hand side of Formula (1) is $\sqrt{2}/2$ (≈0.7) using Vm=1 and Im=$\sqrt{2}$, according to FIG. 4.

When the basic setting of duty is adopted, since irec1=il as expressed by Formula (19), Prec matches Pi nearly at 0.35. This value does not depend on the voltage ratio α. The powers Prec and Pl are indicated by a waveform G10.

As is obvious from the comparison between FIGS. 18 and 17, at the same voltage ratio α, the current irec1 is larger and the current il is smaller when the first modification of duty is adopted than when the basic setting of duty is adopted. However, when the first modification of duty is adopted, discrepancies of the power Prec (indicated by a waveform G11) or the charge power Pl (indicated by a waveform G12) from a value 0.35 become more conspicuous at a smaller voltage ratio α but remain at approximately 10% or less.

Contrastingly, in the technique described in Japanese Patent Application Laid-Open No. 2014-082926, the current il increases and the current irec1 decreases as described with reference to FIG. 6, and such a tendency becomes remarkable especially in the domain with a small voltage ratio α. As described above, the voltage ratio α is desirably kept at 1.2 or less in consideration of the derating of the capacitor C4, and in such a domain, the power Prec1 (indicated by a waveform G13) is much smaller than the charge power Pl (indicated by a waveform G14). In the technique described in Japanese Patent Application Laid-Open No. 2014-082926, accordingly, efficiency becomes lower than in the case in which the basic setting of duty is adopted. In contrast, the comparison between the waveforms G10 and G11 and the comparison between the waveforms G10 and G12 also show that the efficiency does not decrease but, on the contrary, is improved slightly by the adoption of the first modification of duty.

As described above, adopting the first modification of duty can increase the voltage utilization ratio R without decreasing the efficiency. This means that, in other words, the DC voltage Vdc can be increased without increasing the power covered by the power buffer circuit 4.

One reason why this advantage is achieved is that the discharge duty dc is obtained at Vdc=Vm in Formula (17). That is to say, one reason why the above advantage is achieved is that the discharge duty dc is set to a value $(Vm/Vc)\cos^2(\omega t)$ obtained by dividing the product of the crest value Vm and a square $\cos^2(\omega t)$ of a cosine value $\cos(\omega t)$ of the phase $\omega t$ by the both-end voltage Vc across the capacitor C4.

Another reason is that the DC voltage Vdc pulsates in the quarter period, that is, with a quarter of the period of the single-phase AC voltage Vin as its fundamental period. The DC voltage Vdc varies with a half of the period in which the discharge duty dc varies as its fundamental period. Consequently, the DC voltage Vdc can be increased by increasing the ratio (the inverse of the voltage ratio $\alpha$) of the crest value Vm to the both-end voltage Vc (i.e., by reducing the both-end voltage Vc), which affects the discharge duty dc. This decreases the both-end voltage Vc required for obtaining a desired DC voltage Vdc, so that the breakdown voltage required for the capacitor C4 is reduced.

Such pulsations of the DC voltage Vdc can be achieved by setting the rectifying duty drec in a first setting of duty or a second setting of duty. The first correction value of the rectifying duty drec is an absolute value $|\sin(\omega t)|$ of the sine value $\sin(\omega t)$ of the phase $\omega t$, and the second correction value is a value (1−dc) obtained by subtracting the discharge duty dc from 1.

In the basic setting of duty, the zero duty dz is difficult to be reduced because a minimum value of the zero duty dz needs to be kept at zero or more. Thus, the use of the first setting of duty or the second setting of duty can easily reduce the zero duty dz while keeping a minimum value of the zero duty dz at zero or more.

If the voltage ratio $\alpha$ is 1 or more and 1.2 or less as described above, there is no significant difference between the result obtained when the first setting of duty is used and the result obtained when the second setting of duty is used, and the pulsations of the DC voltage Vdc have almost a sinusoidal waveform. The use of the second setting of duty is advantageous in that the need for comparing the first correction value with the second correction value in magnitude is eliminated, simplifying control.

As described in a second modification and a third modification, which will be described below, the above-mentioned advantage can be achieved even when the DC voltage Vdc pulsates with a half of the period of the single-phase AC voltage Vin as a period. In other words, the DC voltage Vdc may vary in the period in which the discharge duty dc varies.

(b-6) Correction of Command Value Associated with Correction of Duty

The correction of the discharge duty dc and the rectifying duty drec as described above results in the correction of the operation of the inverter 5 as well. Typically, the technique using a carrier for inverter and a command value to the carrier in, for example, Ohnuma, Itoh, "Circuit Configuration and Control Strategy of single-to-three Phase Power Converter with Active Buffer and Charge Circuit", the 2010 Annual Meeting of IEEJ, 4-057 (2010), Ohnuma, Itoh, "Control Strategy of Single Phase to Three Phase Power Converter Using an Active Snubber", 2008 IEEJ Industry Applications Society Conference, 1-20 (2008) and Japanese Patent Application Laid-Open No. 2011-193678 is publicly known as the technique for controlling the inverter 5 on the basis of the rectifying duty drec, the discharge duty dc, and the zero duty.

How the command value is corrected in association with the correction of duty will be merely described below, and a detailed description on the control of the inverter 5 will be omitted.

Figure 20:
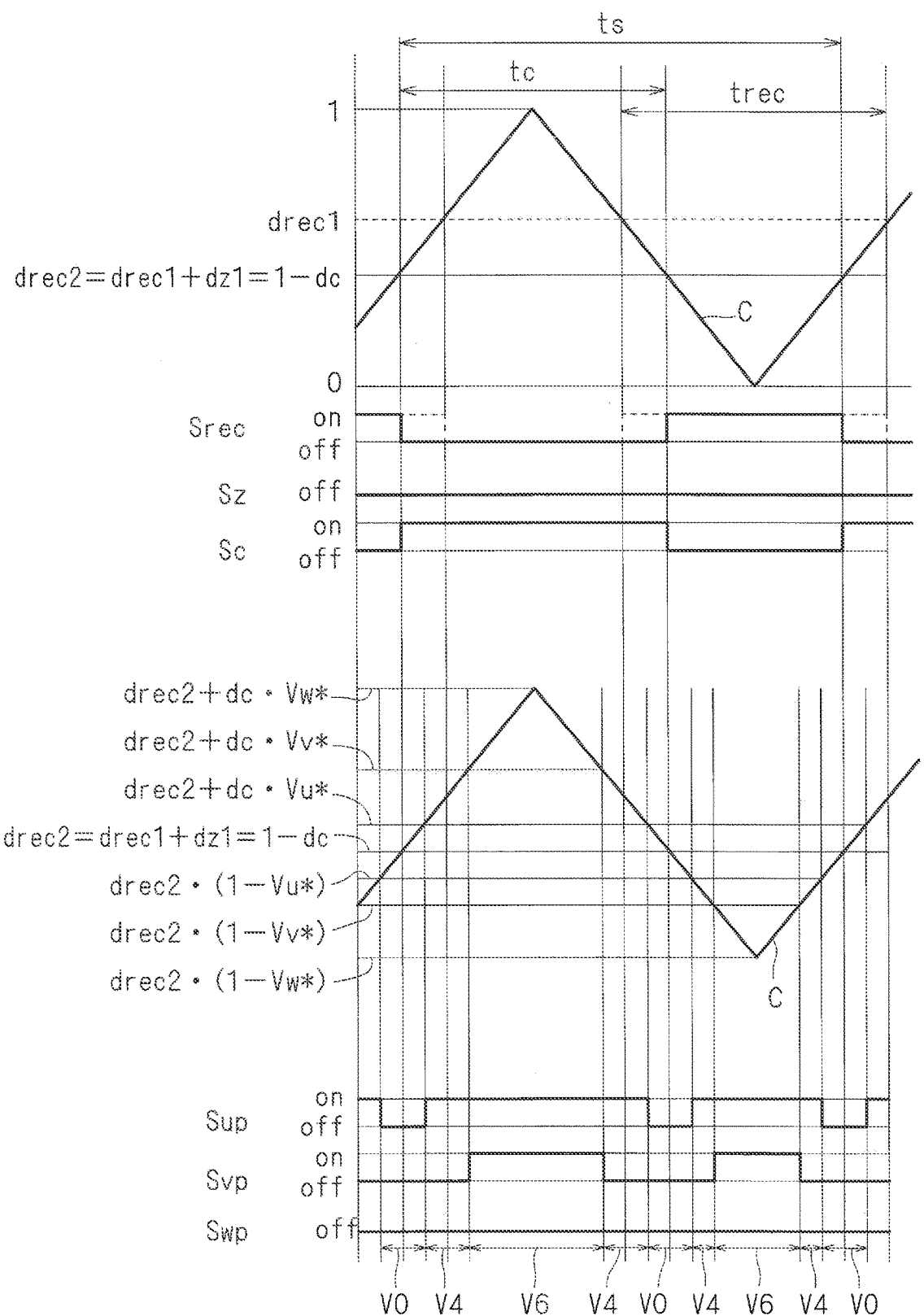
FIG. 20 is a graph showing an operation of a switch of an equivalent circuit and an operation of a switching element of an inverter.

FIG. 20 is a graph showing the operations of switches Srec, Sc, and Sz of the equivalent circuit shown in FIG. 3 and the operations of the switching elements Sup, Svp, and Swp of the inverter 5. The switching elements Sun, Svn, and Swn of the inverter 5 are basically complementary to the operations of the switching elements Sup, Svp, and Swp, description of which will be omitted here.

For the sake of brevity, description will be given of the case in which a carrier C serves as a carrier for controlling the power buffer circuit 4 and a carrier for controlling the inverter 5. Such a technique is used also in Ohnuma, Itoh, "Circuit Configuration and Control Strategy of single-to-three Phase Power Converter with Active Buffer and Charge Circuit", the 2010 Annual Meeting of IEEJ, 4-057 (2010) and Japanese Patent Application Laid-Open No. 2011-193678.

A duration ts of a period of the carrier C is introduced, and the first correction value drec1 and the second correction value drec2 of the rectifying duty drec are introduced.

FIG. 20 shows the case in which the rectifying duty drec takes the second correction value drec2 when the first modification of rectifying duty is adopted. In other words, this is the case in which drec1+dc=$|\sin(\omega t)|+(1/\alpha)\cos^2(\omega t)$ >1.

A duration tc is a duration in which the carrier C is equal to or greater than a value (1−dc), which is a duration in which the switch Sc is conductive (indicated by "on" in the figure: the same applies to the other portion). The duration tc is equal to a product dc·ts of the discharge duty dc and the duration ts.

The duration trec is a duration in which the carrier C is equal to or smaller than the first correction value drec1, which is equal to a product drec1·ts of the first correction value drec1 and the duration ts. However, the case of drec1+dc>1 is shown, and the duration trec is not a duration in which the switch Srec is conductive. The reason for the above is as follows: since the voltage ratio $\alpha$ is equal to or greater than 1, when the switch Sc is conductive and the both-end voltage Vc across the capacitor C4 is applied to the DC link 7, no current flows from the converter 3 to the DC link 7, and the switch Srec is accordingly not conductive. This corresponds to the virtual zero duty dz1=1−drec1−dc being negative.

For reference, FIG. 20 shows, by an extended dashed line, a duration in which the switch Srec is conductive assuming that the switch Srec is conductive during the duration tree. The switch Srec, however, is complementarily conductive with the switch Sc, and the switch Sz is always non-conductive during the duration ts (indicated by "off" in the figure: the same applies to the other portion).

When the first setting of duty is used, the period in which the switch Srec is conductive is a duration in which the carrier C is equal to or smaller than the second correction value drec2. The second correction value drec2 is equal to the value (1−dc). This is also equal to a sum (drec1+dz1) of the first correction value drec1 and the virtual zero duty dz1.

As described above, a signal SSc for controlling the operation of the switch Sc is achieved through the comparison between the carrier C and the value (1−dc).

The signal SSl is obtained by a publicly known technique (for example, Japanese Patent Application Laid-Open No. 2011-193678) once the current il is determined, description of which will be omitted here. The current il is obtained by a calculation (Im·|sin(ωt)|−drec·Idc) of the right-hand side of the first equal sign of Formula (19). In this calculation, drec=1−dc and Idc=Pdc/Vdc=Vm·Im/(2·Vdc) may be used. In such a calculation, the approximate expression of Formula (27) is useful from the viewpoint of easily obtaining the DC voltage Vdc.

The second correction value drec2 of the rectifying duty drec is used as the rectifying duty drec as described above, and accordingly, the command values to the carrier C for obtaining the voltage command values Vu*, Vv*, and Vw* of the three-phase voltage to be output from the inverter 5 are drec2+dc·Vw*, drec2+dc·Vv*, drec2+dc·Vu*, drec2·(1−Vu*), drec2·(1−Vv*), and drec2·(1−Vw*).

The switching element Sup is conductive when the carrier C is equal to or greater than the command value drec2+dc·Vu* or is equal to or smaller than the command value drec2·(1−Vu*). The switching element Svp is conductive when the carrier C is equal to or greater than the command value drec2+dc·Vv* or is equal to or smaller than the command value drec2·(1−Vv*). The switching element Swp is always non-conductive during the duration ts.

FIG. 20 additionally shows voltage vectors V0, V4, and V6. The voltage vector V0 shows the state in which all the switching elements Sup, Svp, and Swp are non-conductive (all the switching elements Sun, Svn, and Swn are accordingly conductive), the voltage vector V4 shows the state in which the switching element Sup is conductive and the switching elements Svp and Swp are non-conductive (accordingly, the switching element Sun is non-conductive and the switching elements Svn and Swn are conductive), and the voltage vector V6 shows the state in which the switching elements Sup and Svp are conductive and the switching element Swp is non-conductive (accordingly, the switching elements Sun and Svn are non-conductive and the switching element Swn is conductive).

The correction of the command values when dz1<0 as described above is introduced in, for example, Japanese Patent No. 5454732 in view of drec2=drec1+dz1, detailed description of which will be omitted. The generation of the signals SSup, SSvp, SSwp, SSun, SSvn, and SSwn associated with the correction is introduced in, for example, Japanese Patent No. 5454732, detailed description of which will be omitted.

C. Modifications (c-1) First Modification

The filter 2 can also be provided between the converter 3 and the power buffer circuit 4 even when any of the techniques described above is used.

FIG. 21 is a circuit diagram showing, as the modification, only the vicinity of the converter 3, the power buffer circuit 4, and the filter 2 that is provided therebetween.

When such a configuration is used, a diode D0 is desirably provided between the filter 2 and the discharge circuit 4a in the DC power supply line LH. The anode of the diode D0 is located adjacent to the filter 2, and the cathode of the diode D0 is located adjacent to the discharge circuit 4a.

The diode D0 prevents the both-end voltage across the capacitor C2 from being affected by the both-end voltage Vc across the capacitor C4 by switching of the switch Sc.

(c-2) Second and Third Modifications

The basic setting of duty and the first modification of duty may be used together. Specifically, the basic setting of duty and the first modification of duty can be used alternately for each quarter of the period of the single-phase AC voltage Vin. Consequently, the DC voltage Vdc varies in a pair of sections that are not adjacent to each other among the sections equally dividing the period into four and is constant in the other pair of the sections.

Figure 22:
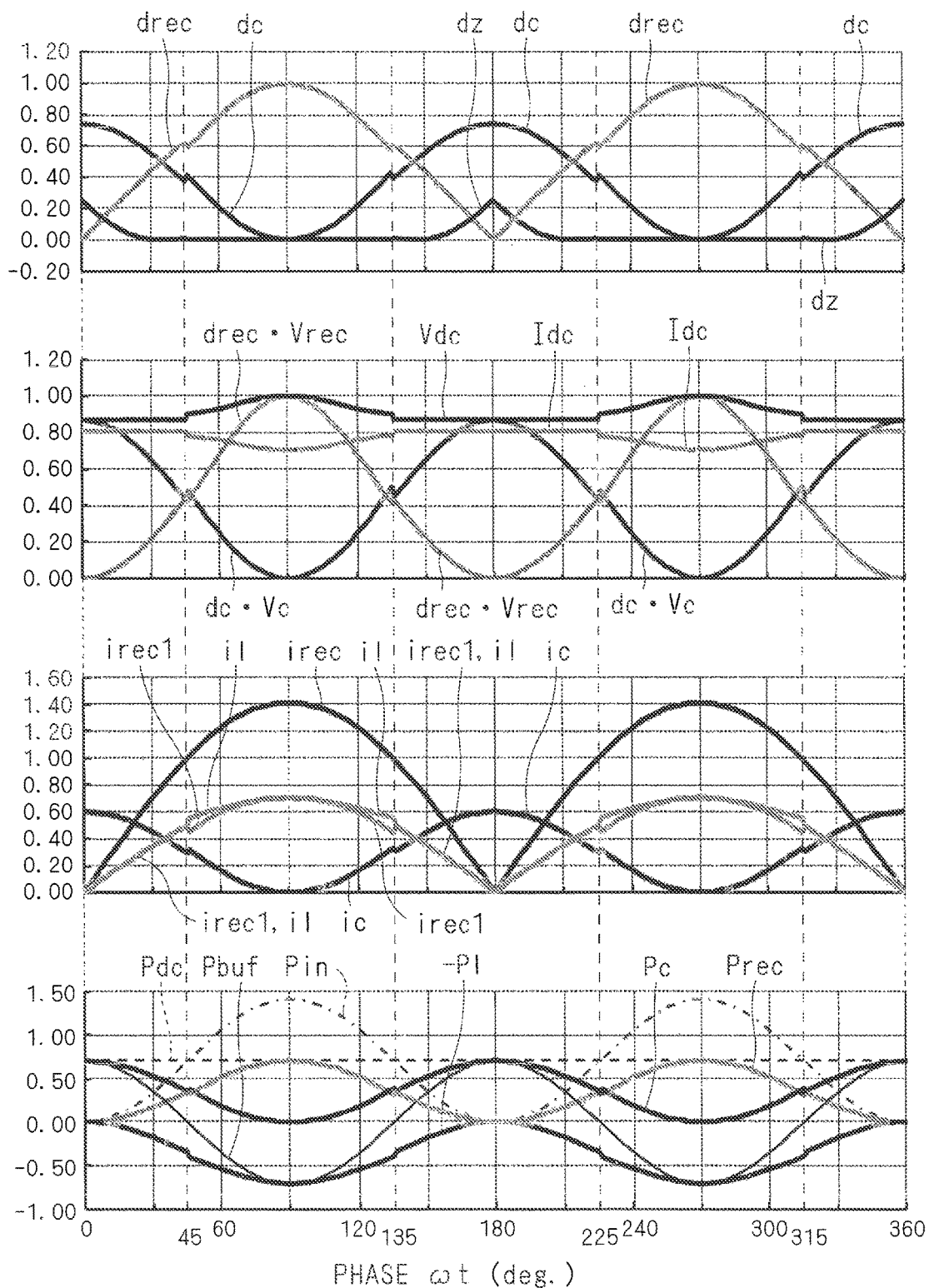
FIG. 22 is a graph showing an operation of the direct power converter according to a second modification.
Figure 23:
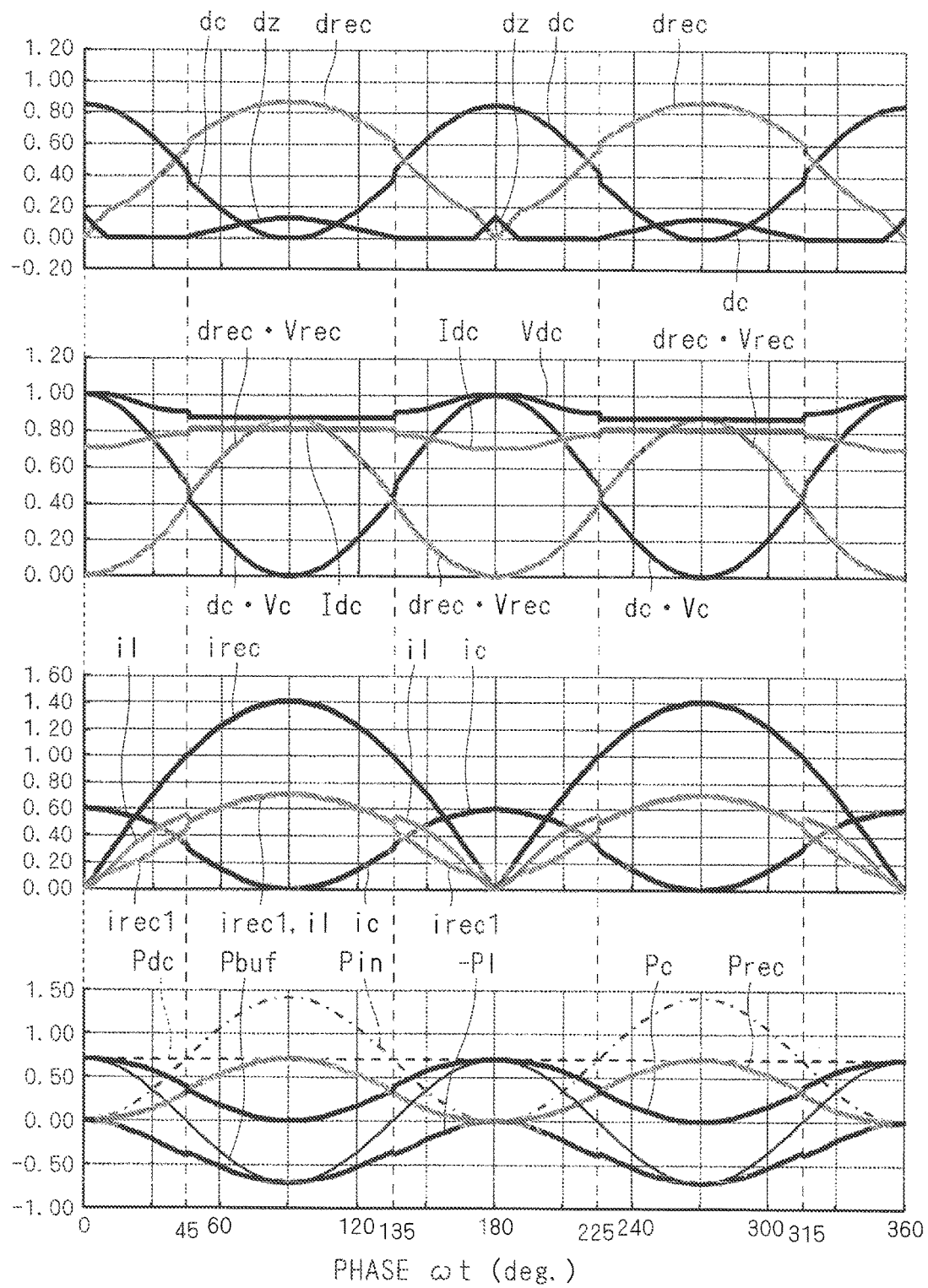
FIG. 23 is a graph showing an operation of the direct power converter according to a third modification.

FIG. 22 is a graph showing the operation of the direct power converter when the basic setting of duty in a quarter period centered around an integral multiple of 180 degrees of the phase ωt and adopts the first modification of duty in the other quarter periods (hereinafter referred to as a "second modification). FIG. 23 is a graph showing an operation of the direct power converter when the first modification of duty in a quarter period around an integral multiple of 180 degrees of the phase ωt and adopts the basic setting of duty in the other quarter periods (hereinafter referred to as a "third modification"). Since a value 1.17 is used as the voltage ratio α in both the cases, FIGS. 22 and 23 show the waveforms in which the graph shown in FIG. 17 and the graph shown in FIG. 18 are used alternately per quarter period. The voltage utilization ratio R is 0.913 in any of the cases, which is a value between a value 0.95 of the voltage utilization ratio R when the first modification of duty is used and a value 0.87 of the voltage utilization ratio R when the basic setting of duty is used.

It can be regarded in both of the second modification and the third modification that the DC voltage Vdc varies with a half of the period of the single-phase AC voltage Vin as its fundamental period or the DC current Idc varies with a half of the above-mentioned period as its fundamental period. Since the DC voltage Vdc when the first modification of duty is used varies with a quarter of the above-mentioned period as its fundamental period, it can be regarded that the voltage Vdc varies in a half period that is twice the fundamental period.

A case in which the input power Pdc takes a constant value is assumed as expressed by Expression (15) and also as indicated by a waveform in both of FIGS. 22 and 23. In such a case, when the DC voltage Vdc is varied with 1/N of the above-mentioned period as its fundamental period, the controller 10 is required to have a current control band that is N or more times the power supply frequency. Compared with the case in which the first setting of duty is used, the second modification and the third modification are advantageous in that a current control band required for the controller 10 is mitigated.

As described in Japanese Patent Application Laid-Open No. 2015-084637, control for making a buffering power Pbuf smaller than an AC component Pin^ is desired to reduce the power capacity of the power buffer circuit 4. In other words, control is desirably performed to make an AC component Pin^ greater than the buffering power Pbuf. In this case, the DC current Idc is desirably large during a duration in which the rectified voltage Vrec is large and small during a duration in which the rectified voltage Vrec is small. Thus, it is desirable that the basic setting of duty in a quarter period centered around an integral multiple of 180 degrees of the phase ωt and adopt the first modification of duty in the other quarter periods as in the second modification.

Such a behavior of the DC current Idc is preferable when the inductive load 6 having a relatively small torque load is used, such as a motor (e.g., magnet-embedded motor) that drives a compressor of an air conditioner. This is because in the domain that requires torque current to increase an rpm, the advancement of a current phase required in a so-called flux-weakening domain is regulated by increasing a voltage that can be output from the inverter 5. This is desirable in view of increasing an upper limit of the rpm compared with the case in which the basic setting of duty is used or compared with the third modification.

While the present invention has been described in detail, the foregoing description is in all aspects illustrative and not restrictive. It is therefore understood that numerous modifications that have not been described can be devised without departing from the scope of the present invention.

The invention claimed is:

1. A power converter comprising:
   a DC link including a first power supply line and a second power supply line;
   a converter that receives a single-phase AC voltage and outputs a pulsating power to said DC link;
   an inverter that receives a power from said DC link and outputs an AC current; and
   a power buffer circuit that receives a charge power from said DC link and outputs a discharge power to said DC link,
   wherein
   an input power input to said inverter takes a value obtained, from said DC link, by subtracting said charge power from a sum of said pulsating power and said discharge power,
   said charge power takes a value that is a half of said pulsating power,
   said discharge power takes a value obtained by adding said charge power to an AC component of said pulsating power,
   said converter applies a rectified voltage obtained by full-wave rectifying said single-phase AC voltage to said DC link while setting said first power supply line to have a higher potential than said second power supply line,
   said power buffer circuit includes
   a discharge circuit including a capacitor and a switch connected in series to said capacitor adjacent to said first power supply line between said first power supply line and said second power supply line, and
   a charge circuit that charges said capacitor,
   a discharge duty that is a duty at which said switch is conductive takes a value obtained by dividing a product of a crest value of said single-phase AC voltage and a square of a cosine value of a phase of said single-phase AC voltage by a both-end voltage across said capacitor,
   said converter is conductive at a rectifying duty, and
   a DC voltage that is a sum of a product of said rectified voltage and said rectifying duty and a product of said both-end voltage and said discharge duty varies in a period that is a half of a period of said single-phase AC voltage.

2. The power converter according to claim 1, wherein said rectifying duty takes any one smaller value of an absolute value of a sine value of said phase and a value obtained by subtracting said discharge duty from 1.

3. The power converter according to claim 1, wherein said rectifying duty takes a value obtained by subtracting said discharge duty from 1.

4. The power converter according to claim 1, wherein a ratio of said both-end voltage to said crest value is 1 or more and 1.2 or less.

5. The power converter according to claim 4, wherein said DC voltage varies in a pair of sections that are not adjacent to each other among sections equally dividing said period of said single-phase AC voltage into four and is constant in the other pair of sections.

6. The power converter according to claim 4, wherein said inverter performs DC-AC conversion with a minimum value of said DC voltage as an upper limit.

7. The power converter according to claim 4, wherein said DC voltage varies with a quarter of said period of said single-phase AC voltage as a fundamental period.

8. The power converter according to claim 1, wherein said DC voltage varies with a quarter of said period of said single-phase AC voltage as a fundamental period.

9. The power converter according to claim 1, wherein said DC voltage varies in a pair of sections that are not adjacent to each other among sections equally dividing said period of said single-phase AC voltage into four and is constant in the other pair of sections.

10. The power converter according to claim 1, wherein said inverter performs DC-AC conversion with a minimum value of said DC voltage as an upper limit.

* * * * *